United States Patent
Salah et al.

(10) Patent No.: US 11,214,232 B2
(45) Date of Patent: Jan. 4, 2022

(54) METHODS AND SYSTEMS FOR PROVIDING BLUETOOTH-BASED PASSIVE ENTRY AND PASSIVE START (PEPS) FOR A VEHICLE

(71) Applicant: STRATTEC SECURITY CORPORATION, Milwaukee, WI (US)

(72) Inventors: Abdel H. Salah, Greenfield, WI (US); Prahlad Narasimhamurthy Ramakrishna, Bangalore (IN); Nayudu Mallipudi, Kakinada (IN)

(73) Assignee: STRATTEC SECURITY CORPORATION, Milwaukee, WI (US)

( * ) Notice: Subject to any disclaimer, the term of this patent is extended or adjusted under 35 U.S.C. 154(b) by 0 days.

(21) Appl. No.: 17/038,078

(22) Filed: Sep. 30, 2020

(65) Prior Publication Data
US 2021/0078535 A1 Mar. 18, 2021

Related U.S. Application Data

(63) Continuation of application No. 16/394,935, filed on Apr. 25, 2019, now Pat. No. 10,793,109, which is a (Continued)

(51) Int. Cl.
*B60R 25/24* (2013.01)
*H04W 4/02* (2018.01)
(Continued)

(52) U.S. Cl.
CPC ............ *B60R 25/24* (2013.01); *B60R 25/209* (2013.01); *B60R 25/245* (2013.01); *H04W 4/023* (2013.01);
(Continued)

(58) Field of Classification Search
CPC ........ B60R 2325/101; B60R 2325/108; B60R 2325/205; B60R 25/209; B60R 25/24;
(Continued)

(56) References Cited

U.S. PATENT DOCUMENTS

| 6,424,056 B1 | 7/2002 | Irvin |
| 7,106,171 B1 | 9/2006 | Burgess |

(Continued)

FOREIGN PATENT DOCUMENTS

| WO | WO2016139301 A1 | 9/2016 |
| WO | WO2017017164 A1 | 2/2017 |

(Continued)

OTHER PUBLICATIONS

International Search Report and Written Opinion for Application No. PCT/US19/16344 dated Apr. 29, 2019 (17 pages).

(Continued)

*Primary Examiner* — Nader Bolourchi
(74) *Attorney, Agent, or Firm* — Michael Best & Friedrich LLP

(57) ABSTRACT

Systems and methods for performing a vehicle operation. One system includes a plurality of transceivers associated with a vehicle and a vehicle access system. The vehicle access system is configured to receive, via each of the plurality of transceivers, signal strength data associated with a portable communication device using a Bluetooth signal received at an antenna associated with each of the plurality of transceivers, and compare, for each of the plurality of transceivers, the signal strength data with a threshold signal strength value to perform a localization of the portable communication device generating the Bluetooth signal to determine whether the portable communication device is located inside or outside the vehicle. The vehicle access system is also configured to perform the operation based on (Continued)

whether the portable communication device is located inside or outside the vehicle.

20 Claims, 14 Drawing Sheets

Related U.S. Application Data continuation of application No. PCT/US2019/016344, filed on Feb. 1, 2019.

(60) Provisional application No. 62/625,179, filed on Feb. 1, 2018.

(51) Int. Cl.
  *H04W 4/48* (2018.01)
  *B60R 25/20* (2013.01)

(52) U.S. Cl.
  CPC ......... *H04W 4/48* (2018.02); *B60R 2325/101* (2013.01); *B60R 2325/108* (2013.01); *B60R 2325/205* (2013.01)

(58) Field of Classification Search
  CPC .... B60R 25/245; H04W 12/08; H04W 4/023; H04W 4/48; H04W 4/80
  See application file for complete search history.

(56) References Cited

U.S. PATENT DOCUMENTS

| | | | |
|---|---|---|---|
| 7,629,875 | B2 | 12/2009 | Baumgartner et al. |
| 8,126,450 | B2 | 2/2012 | Howarter et al. |
| 8,344,850 | B2 | 1/2013 | Girard, III et al. |
| 8,355,672 | B2 | 1/2013 | Hinsey |
| 8,373,541 | B2 | 2/2013 | Tarmoom et al. |
| 8,421,589 | B2 | 4/2013 | Sultan et al. |
| 8,593,249 | B2 | 11/2013 | Bliding et al. |
| 8,751,065 | B1 | 6/2014 | Kato |
| 8,847,731 | B2 | 9/2014 | Tieman |
| 8,983,534 | B2 | 3/2015 | Patel |
| 9,008,917 | B2 | 4/2015 | Gautama et al. |
| 9,045,102 | B2 | 6/2015 | Caratto et al. |
| 9,063,833 | B2 | 6/2015 | Malone et al. |
| 9,079,560 | B2 | 7/2015 | Gautama et al. |
| 9,158,290 | B2 | 10/2015 | Jain et al. |
| 9,162,648 | B1 | 10/2015 | Weng et al. |
| 9,218,700 | B2 | 12/2015 | Gautama et al. |
| 9,241,235 | B2 | 1/2016 | Santavicca |
| 9,336,637 | B2 | 5/2016 | Neil et al. |
| 9,499,125 | B2 | 11/2016 | Akay et al. |
| 9,533,653 | B2 | 1/2017 | Daman et al. |
| 9,533,654 | B2 | 1/2017 | Talty et al. |
| 9,536,364 | B2 | 1/2017 | Talty et al. |
| 9,536,365 | B2 | 1/2017 | Wisnia |
| 9,666,005 | B2 | 5/2017 | Ellis et al. |
| 9,694,787 | B2 | 7/2017 | Kornek et al. |
| 9,701,281 | B2 | 7/2017 | Reiser |
| 9,718,440 | B2 | 8/2017 | Kim et al. |
| 9,721,404 | B2 | 8/2017 | Muller |
| 9,734,647 | B2 | 8/2017 | Lee |
| 9,736,669 | B2 | 8/2017 | Frye et al. |
| 9,807,570 | B1 | 10/2017 | Lazarini et al. |
| 9,818,151 | B2 | 11/2017 | Ehrman |
| 9,845,070 | B2 | 12/2017 | Petel et al. |
| 9,875,591 | B2 | 1/2018 | Watters et al. |
| 9,928,673 | B2 | 3/2018 | Berezin et al. |
| 9,947,153 | B2 | 4/2018 | Bergerhoff et al. |
| 9,981,615 | B2 | 5/2018 | Flick |
| 10,035,494 | B2 | 7/2018 | Sute |
| 10,075,575 | B2 | 9/2018 | Dentamaro et al. |
| 10,083,556 | B1 | 9/2018 | Jain et al. |
| 10,101,433 | B2 | 10/2018 | Laifenfeld et al. |
| 10,130,257 | B2 | 11/2018 | Lacher et al. |
| 10,131,319 | B2 | 11/2018 | Honkanen |
| 10,169,941 | B2 | 1/2019 | Menard et al. |
| 10,187,793 | B2 | 1/2019 | Petel |
| 10,202,100 | B1 | 2/2019 | Tucker et al. |
| 10,202,102 | B2 | 2/2019 | Hiramine |
| 10,262,479 | B2 | 4/2019 | Odejerte, Jr. et al. |
| 10,266,148 | B2 | 4/2019 | Mahaupt et al. |
| 10,306,046 | B2 | 5/2019 | Musial |
| 10,308,219 | B2 | 6/2019 | Reiser |
| 10,311,661 | B2 | 6/2019 | Menard et al. |
| 10,315,624 | B2 | 6/2019 | Santavicca et al. |
| 10,322,694 | B2 | 6/2019 | Honkanen |
| 10,328,898 | B2 | 6/2019 | Golsch |
| 10,328,900 | B1 | 6/2019 | Yakovenko et al. |
| 10,362,119 | B2 | 7/2019 | Morales |
| 10,369,964 | B2 | 8/2019 | Woodill, Jr. et al. |
| 10,410,447 | B2 | 9/2019 | Ellis et al. |
| 10,415,528 | B2 | 9/2019 | Chaplow et al. |
| 10,440,576 | B1 | 10/2019 | Casamassima et al. |
| 10,479,320 | B2 | 11/2019 | Menard et al. |
| 10,493,981 | B2 | 12/2019 | Lavoie et al. |
| 10,507,794 | B2 | 12/2019 | Lee |
| 10,521,736 | B2 | 12/2019 | Grimm et al. |
| 10,532,719 | B2 | 1/2020 | Bocca et al. |
| 10,532,720 | B2 | 1/2020 | Froitzheim et al. |
| 10,538,220 | B1 | 1/2020 | Tyagi et al. |
| 10,569,739 | B2 | 2/2020 | Pudar et al. |
| 10,569,740 | B2 | 2/2020 | Lee |
| 10,576,932 | B2 | 3/2020 | Yakovenko et al. |
| 10,636,238 | B2 | 4/2020 | Lee |
| 10,793,109 | B2 | 10/2020 | Salah et al. |
| 2012/0136511 | A1 | 5/2012 | Dickerhoof et al. |
| 2014/0188309 | A1 | 7/2014 | Caratto et al. |
| 2014/0240091 | A1 | 8/2014 | Talty et al. |
| 2015/0009010 | A1 | 1/2015 | Biemer |
| 2015/0332532 | A1 | 11/2015 | Lee et al. |
| 2015/0362997 | A1 | 12/2015 | Hatton |
| 2016/0318475 | A1 | 11/2016 | Honkanen |
| 2016/0320469 | A1 | 11/2016 | Laifenfeld et al. |
| 2016/0325710 | A1 | 11/2016 | Honkanen |
| 2017/0018128 | A1 | 1/2017 | Berezin et al. |
| 2017/0050615 | A1 | 2/2017 | Schindler |
| 2017/0236351 | A1 | 8/2017 | Menard et al. |
| 2017/0243422 | A1 | 8/2017 | Menard et al. |
| 2017/0298659 | A1 | 10/2017 | Watanabe |
| 2017/0334394 | A1 | 11/2017 | Menard et al. |
| 2017/0342750 | A1 | 11/2017 | Hiramine |
| 2017/0345241 | A1 | 11/2017 | Santavicca |
| 2018/0029560 | A1 | 2/2018 | Mohaupt et al. |
| 2018/0091930 | A1 | 3/2018 | Jefferies |
| 2018/0099643 | A1 | 4/2018 | Golsch et al. |
| 2018/0178759 | A1 | 6/2018 | Santavicca |
| 2018/0186332 | A1 | 7/2018 | Bocca et al. |
| 2018/0191829 | A1 | 7/2018 | Morales |
| 2018/0194323 | A1 | 7/2018 | Woodill, Jr. et al. |
| 2018/0236972 | A1 | 8/2018 | Linden et al. |
| 2018/0247472 | A1 | 8/2018 | Odejerte, Jr. et al. |
| 2018/0297558 | A1 | 10/2018 | Froitzheim |
| 2018/0322273 | A1 | 11/2018 | Biondo et al. |
| 2018/0339676 | A1 | 11/2018 | Lazarini et al. |
| 2019/0039567 | A1 | 2/2019 | Froitzheim et al. |
| 2019/0039568 | A1 | 2/2019 | Froitzheim |
| 2019/0090093 | A1* | 3/2019 | Odejerte, Jr. ........... H04W 4/80 |
| 2019/0092280 | A1 | 3/2019 | Oesterling et al. |
| 2019/0130682 | A1 | 5/2019 | Farges |
| 2019/0212425 | A1 | 7/2019 | Odejerte, Jr. |
| 2019/0304224 | A1 | 10/2019 | Golsch |
| 2019/0311452 | A1 | 10/2019 | McNabb |
| 2020/0010051 | A1 | 1/2020 | Dumov |
| 2020/0013238 | A1 | 1/2020 | Shimano |
| 2020/0014099 | A1 | 1/2020 | Ghabra et al. |
| 2020/0059758 | A1 | 2/2020 | Santavicca et al. |

FOREIGN PATENT DOCUMENTS

| | | |
|---|---|---|
| WO | WO2017062448 A1 | 4/2017 |
| WO | WO2017133943 A1 | 8/2017 |
| WO | WO2017157541 A1 | 9/2017 |
| WO | WO2017181035 A1 | 10/2017 |

(56) References Cited

FOREIGN PATENT DOCUMENTS

| WO | WO2017191480 A1 | 11/2017 |
| WO | WO2018028145 A1 | 2/2018 |
| WO | WO2018028146 A1 | 2/2018 |
| WO | WO2018127353 A1 | 7/2018 |
| WO | WO2018127510 A1 | 7/2018 |
| WO | WO2018137475 A1 | 8/2018 |
| WO | WO2018173310 A1 | 9/2018 |
| WO | WO2019070664 A1 | 4/2019 |
| WO | WO2019201305 A1 | 10/2019 |

OTHER PUBLICATIONS

International Preliminary Report on Patentability for related Application No. PCT/US19/16344 dated Aug. 13, 2020 (10 pages).

* cited by examiner

METHODS AND SYSTEMS FOR PROVIDING BLUETOOTH-BASED PASSIVE ENTRY AND PASSIVE START (PEPS) FOR A VEHICLE

RELATED APPLICATIONS

This application is a continuation of U.S. patent application Ser. No. 16/394,935, filed Apr. 25, 2019, which is a continuation of PCT Patent Application No. PCT/US2019/016344, filed Feb. 1, 2019, which claims priority to U.S. Provisional Patent Application No. 62/625,179 filed Feb. 1, 2018, the entire content of all prior-filed applications is incorporated by reference herein.

FIELD

Embodiments described herein relate generally to systems and methods for vehicle access and start. More specifically, embodiments described herein include Bluetooth-based systems and methods for determining the location of a portable communication device (for example, a key fob or a smart phone) with respect to a vehicle and perform passive entry and passive start functions associated with the vehicle based on the determined location.

SUMMARY

Vehicle access systems have seen a number of changes with regard to the various technologies and methods deployed for the benefit of vehicle users. Early vehicles used systems including mechanical locks and keys. These mechanical lock systems were improved to provide keyless entry to the vehicle. With the growth in wireless technology, the keyless entry systems have been transformed into remote keyless entry (RKE) systems that use a handheld transmitter (a key fob) to gain access to the vehicle. The handheld transmitters enable the user to remotely lock and/or unlock the vehicle from a distance using radio waves. RKE systems offer vehicle access functions, such as door lock, unlock, panic, and remote start of the vehicle.

Recently, RKE systems have become passive entry passive start (PEPS) systems that allow the user to lock and/or unlock one or more doors of a vehicle without using a key or interacting with a key fob and to start and/or stop the engine (or motor in a hybrid or electric vehicle) by simply pushing an ignition button. Unlike previous keyless entry systems, vehicles having a PEPS system typically do not require the user to manually operate a portable communication device (e.g., a key fob) to access the vehicle or to perform other keyless entry functions. In PEPS systems, the user typically carries a portable communication device while approaching the vehicle to perform unlock and/or lock functions, and a vehicle access system (VAS) included in the vehicle performs an authentication process to start and/or stop the engine based on detecting the portable communication device inside the vehicle. Portable communication devices used in PEPS systems often come with the option of remote access functions when the portable communication device is within the predefined vicinity of the vehicle. However, such PEPS systems pose an inherent security threat because these systems are unable to accurately distinguish whether the portable communication device is inside the vehicle or outside the vehicle. It may, therefore, be possible for an intruder to gain access to the vehicle and to operate the vehicle while the user is in the vicinity of the vehicle. Additionally, unlike conventional key fobs, portable communication devices routinely carried by users, such as smart phones, are not configured to perform communicate at radio frequencies commonly used for wireless communication with a vehicle. Accordingly, users are often required to carry a portable communication device dedicated for communication with the vehicle. Thus, improved methods and systems to provide secure and accurate localization of portable communication devices by vehicle users would be welcome.

Passive entry passive start (PEPS) systems are provided herein that are configured to locate a portable communication device using short-range wireless communication (such as Bluetooth and Near Field Communication (NFC)) and to provide passive entry and start vehicle operations based on the determined location of the portable communication device. In some embodiments, the PEPS system includes a wireless communication modules (such as Bluetooth Low Energy (BLE) modules), a vehicle access system (VAS), and a portable communication device, such as a key fob and/or a smart phone. The PEPS system allows a user to have a hands-free method to access and operate a vehicle. One of the functionalities of the PEPS system includes providing localization of a portable communication device (for example, identifying whether a key fob or a smart phone is inside the vehicle or outside the vehicle). Embodiments provided herein describe a method by which localization is performed using BLE systems to permit vehicular access to the user to perform a requested PEPS function.

Embodiments provided herein describe the use of the Industrial Scientific and Medical (ISM) frequency bands for BLE/NFC-based wireless communication between a portable communication device and a vehicle. Utilizing BLE/NFC for communication opens up the possibility of using other types of portable communication devices (including wearables) offering similar wireless features, thereby replacing the need for a user to carry a key fob in addition to other portable communication devices.

Methods to improve existing PEPS systems are also provided herein, wherein the conventional automotive frequency band is replaced by Industrial Scientific and Medical (ISM) band frequencies, thereby enabling vehicle access using various types of portable communication devices. For example, embodiments provided herein provide a method to perform PEPS-related functions in a vehicle, such as door lock and/or unlock, engine (or motor) start and/or stop, or the like, by using a portable communication device with short range wireless capabilities, including key fobs or smart devices, such as smart phones or any other wearable device.

Using higher ISM band frequencies such as 2.4 GHz, which are generally used in Bluetooth communication, provides increased security and accurate localization in detection of portable communication devices inside or outside a vehicle. Moreover, portable communication devices, such as smart phones and wearable devices, that make use of existing communication interfaces, such as Bluetooth and/or NFC, can be configured to interface with the VAS provided herein.

In some embodiments, the function of the PEPS system has dependencies related to the location of the user (represented by the location of a portable communication device carried by the user) with respect to the vehicle. Accordingly, embodiments provided provide a localization method using multiple BLE modules strategically placed in the vehicle that help localize the portable communication device based on signal strength. For example, in methods described herein, a VAS determines the location of a portable communication device with respect to a vehicle based at least in part on the signal strength received from the portable communication device at one or more wireless BLE modules associated with the vehicle. The use of multiple BLE modules minimizes errors and reduces the chance of the system reporting false positives and/or false negatives.

For example, some embodiments include a system for providing passive entry and start in a vehicle. The system includes a plurality of transceivers (for example, Bluetooth transceivers) associated with the vehicle, such as a plurality of transceivers positioned within an interior of the vehicle. The system also includes a VAS coupled to each of the plurality of transceivers. The VAS is configured to send a wake-up signal to each of the plurality of transceivers. The VAS is also configured to receive, via each of the plurality of transceivers, signal strength data associated with the portable communication device using a Bluetooth signal received at an antenna associated with each of the plurality of transceivers, and compare, for each of the plurality of transceivers, the signal strength data with a threshold signal strength value. The VAS is further configured to, in response to comparing the signal strength data received from each of the plurality of transceivers to the threshold signal strength value, perform a localization of the portable communication device generating the Bluetooth signal to determine whether the portable communication device is located inside or outside the vehicle, and perform the operation based on whether the portable communication device is located inside or outside the vehicle.

Additional embodiments also provide a method of performing an operation of a vehicle (e.g., passive entry and/or passive start in a vehicle) via a portable communication device. The method includes sending, with an electronic processor, a wake-up signal to each of a plurality of transceivers associated with the vehicle and receiving, with the electronic processor, via each of the plurality of transceivers, signal strength data associated with the portable communication device using a Bluetooth signal received at an antenna associated with each of the plurality of transceivers. The method also includes comparing, with the electronic processor, for each of the plurality of transceivers, the signal strength data with a threshold signal strength value, and, in response to comparing the signal strength data received from each of the plurality of transceivers to the threshold signal strength value, performing, with the electronic processor a localization of the portable communication device generating the Bluetooth signal to determine whether the portable communication device is located inside or outside the vehicle. The method also includes passively performing the operation based on whether the portable communication device is located inside or outside the vehicle.

Further embodiments provide a non-transitory, computer-readable medium storing instructions that, when executed by an electronic processor, perform a set of functions. The set of functions includes receiving, via each of a plurality of transceivers associated with a vehicle, signal strength data associated with a portable communication device using a Bluetooth signal received at an antenna associated with each of the plurality of transceivers and comparing for each of the plurality of transceivers, the signal strength data with a threshold signal strength value. The set of functions also includes, in response to comparing the signal strength data received from each of the plurality of transceivers to the threshold signal strength value, performing a localization of the portable communication device generating the Bluetooth signal to determine whether the portable communication device is located inside or outside the vehicle, and performing an operation of the vehicle based on whether the portable communication device is located inside or outside the vehicle.

Other aspects of the various embodiments provided herein will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
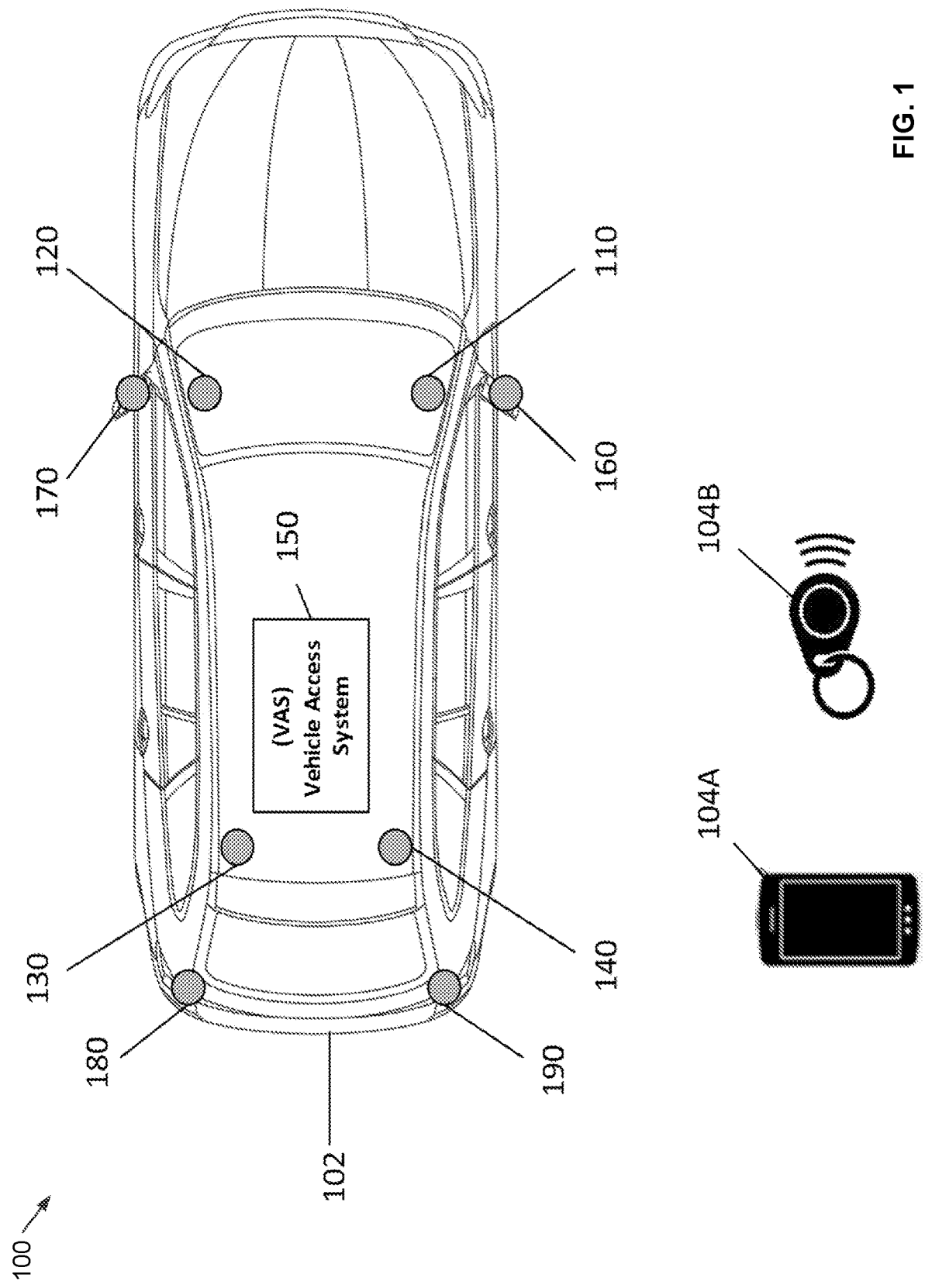
FIG. 1 illustrates a localization system to provide PEPS functionality in a vehicle in accordance with some embodiments.

Skilled artisans will appreciate that elements in the figures are illustrated for simplicity and clarity, and have not necessarily been drawn to scale. For example, the dimensions of some of the elements in the figures may be exaggerated relative to other elements to help to improve understanding of embodiments provided herein.

Components of the apparati and methods described herein have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

One or more embodiments are described and illustrated in the following description and accompanying drawings. These embodiments are not limited to the specific details provided herein, and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed.

Furthermore, some embodiments described herein may include one or more electronic processors configured to perform the described functionality by executing instructions stored in non-transitory, computer-readable medium. It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparati described herein. Alternatively, some or all functions could be implemented by a state machine that has no stored program instructions, or in one or more application-specific integrated circuits (ASICs), in which each function or some combinations of certain of the functions are implemented as custom logic. Of course, a combination of the two approaches could be used.

Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings, and can include electrical connections or couplings, whether direct or indirect.

FIG. 1 illustrates a localization system 100 to provide passive entry passive start (PEPS) functionality in a vehicle 102 in accordance with some embodiments. As shown in FIG. 1, the localization system 100 includes a plurality of transceivers 110, 120, 130 and 140 positioned within the vehicle 102 (e.g., placed at four corners within an interior portion of the vehicle 102) and, optionally, a plurality of transceivers 160, 170, 180, and 190 positioned on an exterior surface of the vehicle 102 (e.g., placed at four exterior positions on the vehicle 102). As used in the present application, an "exterior surface" includes a position outside of the vehicle body or passenger compartment, which may be outside or inside a component of the vehicle 102. For example, in some embodiments, one or more of the transceivers (e.g., 160, 170, 180, or 190) are positioned within a mirror of the vehicle 102, a bumper or fender of the vehicle 102, or the like, which positions these transceivers outside of the vehicle body or passenger compartment.

The localization system 100 also includes a vehicle access system (VAS) 150 configured to communicate with a portable communication device 104 (for example, a smart phone 104A and/or a key fob 104B). Each of the transceivers 110, 120, 130, 140, 160, 170, 180, and 190 includes an antenna (see FIG. 3) configured to wirelessly communicate with the portable communication device 104. In some embodiments, the antennae associated with the transceivers 110, 120, 130, 140, 160, 170, 180 and 190 are omnidirectional antennae. In some embodiments, the localization system 100 uses hardware, software, firmware, system on-a-chip technology, or a combination thereof to implement the PEPS functionality in the vehicle 102. It should be understood that the localization system 100 illustrated in FIG. 1 is provided as one example and other configurations for this system 100 are possible including fewer or additional components.

Figure 2:
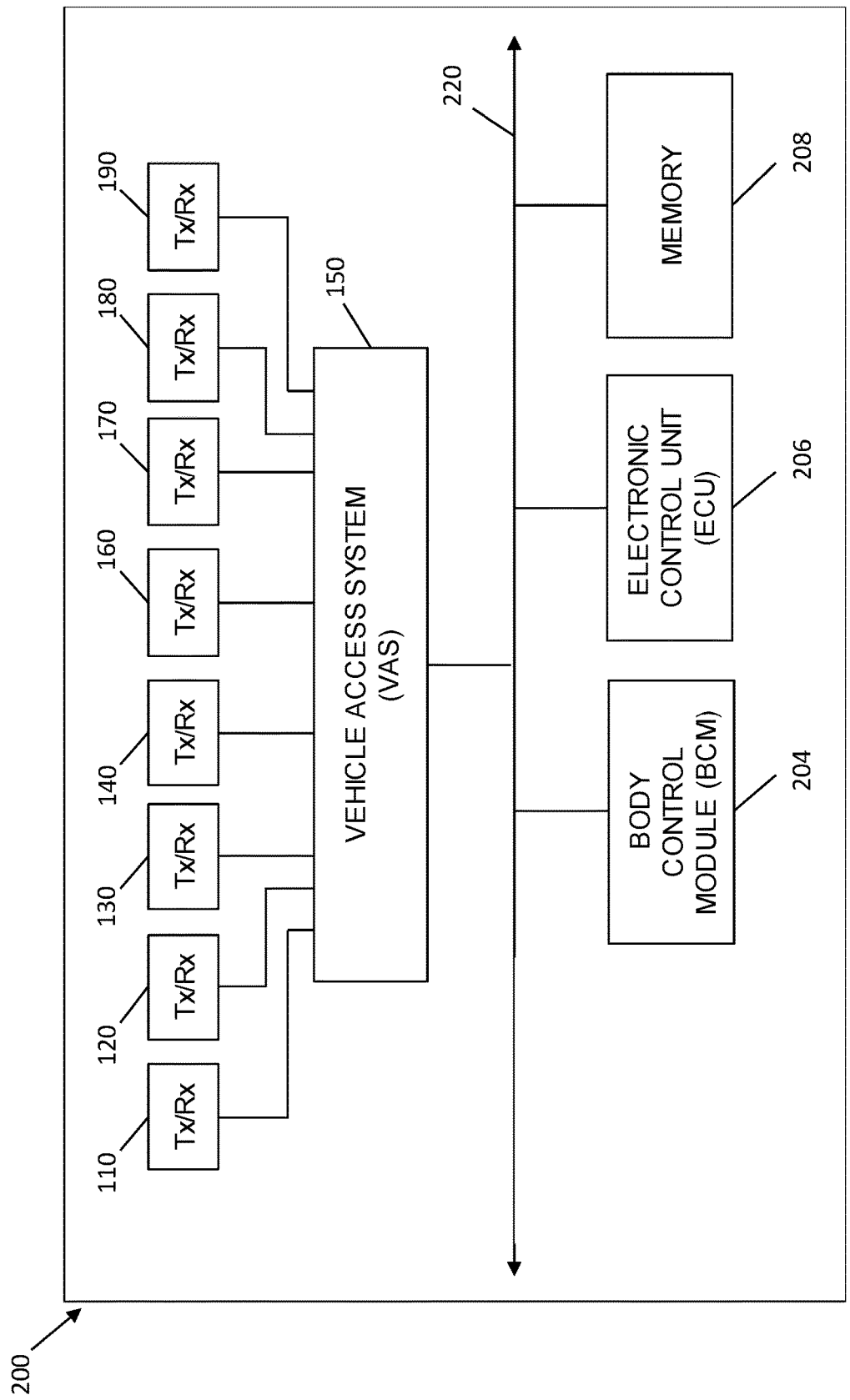
FIG. 2 is a block diagram of the PEPS system in accordance with some embodiments.

FIG. 2 is a block diagram of a PEPS system 200 included in the localization system 100 in accordance with some embodiments. The PEPS system 200 includes a body control module (BCM) 204, an electronic control unit 206, a memory 208, and the VAS 150 coupled to a vehicle bus 220. As shown in FIG. 2, the transceivers 110, 120, 130, 140, 160, 170, 180, and 190 are coupled to the VAS 150 (e.g., via a wired connection, a wireless connection, or a combination thereof)

In some embodiments, the BCM 204 is responsible for monitoring and controlling various electronic accessories associated with the vehicle 102. The BCM 204 may control load drivers and actuate relays that in turn perform actions in the vehicle 102, such as controlling a central locking system of the vehicle 102 (e.g., locking or unlocking of one or more doors included in the vehicle 102 (or other lockable components of the vehicle 102)). In some embodiments, the BCM 204 is also configured to control power windows, power mirrors, air conditioning equipment, overhead lamps, and/or an immobilizer associated with the vehicle 102. To perform this control, the BCM 204 communicates with other on-board computers and systems included in the vehicle 102 via the vehicle bus 220. The vehicle bus 220, or other component interconnections, permit communication among the components of the PEPS system 200. The vehicle bus 220 may be, for example, one or more buses or other wired or wireless connections, as is known in the art. The vehicle bus 220 may have additional elements, which are omitted herein for simplicity, such as controllers, buffers (for example, caches), drivers, repeaters and receivers, or other similar components, to enable communications. The vehicle bus 220 operates according to one or more addressing schemes, data communication or connection protocols, or the like to enable appropriate communications among the aforementioned components.

The electronic control unit 206 is an embedded system that controls one or more systems or subsystems (e.g., electrical systems or subsystems) included in the vehicle 102, such as, for example, the vehicle's engine and other components. As noted above, in some embodiments, the vehicle 102 is a hybrid or electric vehicle. Thus, in these embodiments, the electronic control unit 206 may be configured to control a motor or other powertrain component of the vehicle 102. Thus, the embodiments described herein are not limited to vehicles with internal combustion engines.

Although the electronic control unit 206 is shown as being part of the PEPS system 200 in the illustrated embodiment, in other embodiments, the electronic control unit 206 may be separate from the PEPS 200, and the electronic control unit 206 may or may not communicate with the PEPS 200 in this configuration. For example, in some embodiments, vehicle start or engine start is controlled by the BCM 204, so authorization from the PEPS 200 is provided to the BCM 204. However, the vehicle 102 may include additional supporting components (e.g., electrical steering control unit) that provide signals to the BCM 204, which can be used for authentication or other purposes. Thus, in these configurations, the PEPS 200 may communicate with the ECU 206 (or other ECUs) indirectly. As illustrated in FIG. 2, the ECU 206 communicates with the BCM 204 via the vehicle bus 220 (which other components of the PEPS 200 may use to communicate.

Figure 3:
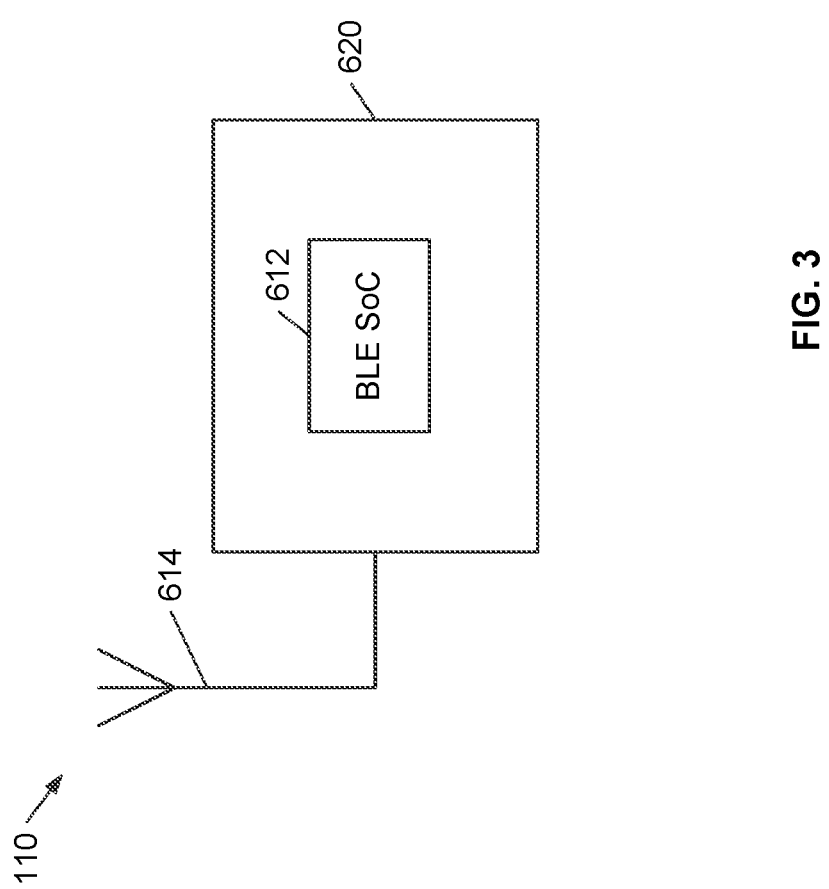
FIG. 3 illustrates one of the transceivers (for example, BLE nodes used for localization) shown in FIGS. 1 and 2, in accordance with some embodiments.

FIG. 3 is a block diagram of one of the transceivers 110 (for example, a Bluetooth Light Energy (BLE) module) used for providing localization to perform various PEPS functionalities in accordance with some embodiments. The transceiver 110 shown in FIG. 3 includes a BLE module 620 having a BLE system-on-chip (SoC) 612 and an antenna 614. The antenna 614 is configured to receive Bluetooth signals from a portable communication device 104 (such as a smart phone 104A, a key fob 104B, or other device) that is trying to access the PEPS functionalities of the vehicle 102. As noted above, the antenna 614 may be an omnidirectional antennae. It should be understood that the transceiver 110 illustrated in FIG. 3 is provided as one example configuration of such a transceiver and the transceivers included in the PEPS system 200 may include fewer or more components in different configurations or forms than illustrated in FIG. 3 while still providing the functionality described herein as being performed by a transceiver. Also, in some embodiments, different transceivers included in the vehicle 102 may have different configurations or forms while still providing the functionality described herein. In other words, all of the transceivers included in the vehicle 102 may not be identical in some embodiments.

Figure 4:
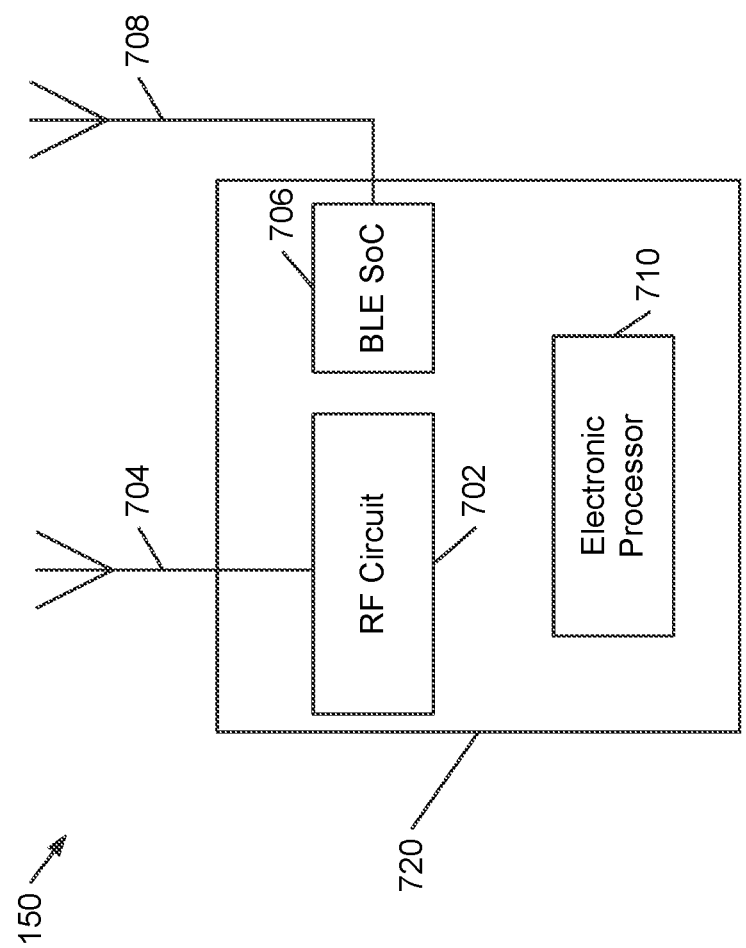
FIG. 4 illustrates a VAS configured to communicate with one of the BLE nodes shown in FIG. 3, in accordance with some embodiments.

FIG. 4 is a block diagram of the VAS 150 in accordance with some embodiments. As shown in the illustrated embodiment of FIG. 4, the VAS 150 includes an radio frequency (RF) circuit 702 coupled to an antenna 704, a BLE SoC 706 coupled to an antenna 708, and an electronic processor 710 within an enclosure 720. The electronic processor 710 is coupled to the RF circuit 702 and the BLE SoC 704, and, in some embodiments, performs, among other things, the functionality described herein for locating the portable communication device 104 with respect to the vehicle 102. The electronic processor 710 may include at least one processor or microprocessor that interprets and executes a set of instructions stored in non-transitory memory included in the VAS 150 or separate from the VAS 150 (e.g., the memory 208). For example, the electronic processor 710 may be configured to execute one or more software programs to perform a set of functions, including the methods and functions described herein. The memory storing these one or more software programs may include volatile memory elements (for example, random access memory (RAM)), nonvolatile memory elements (for example, read-only memory (ROM)), and combinations thereof. The memory may have a distributed architecture, where various components are situated remotely from one another, but may be accessed by the electronic processor 710. It should be understood that the VAS 150 illustrated in FIG. 4 is provided as one example configuration of the VAS 150 and, in some embodiments, the VAS 150 may include fewer or more components in different configurations or forms than illustrated in FIG. 4 while still providing the functionality described herein as being performed by the VAS 150.

Figure 5:
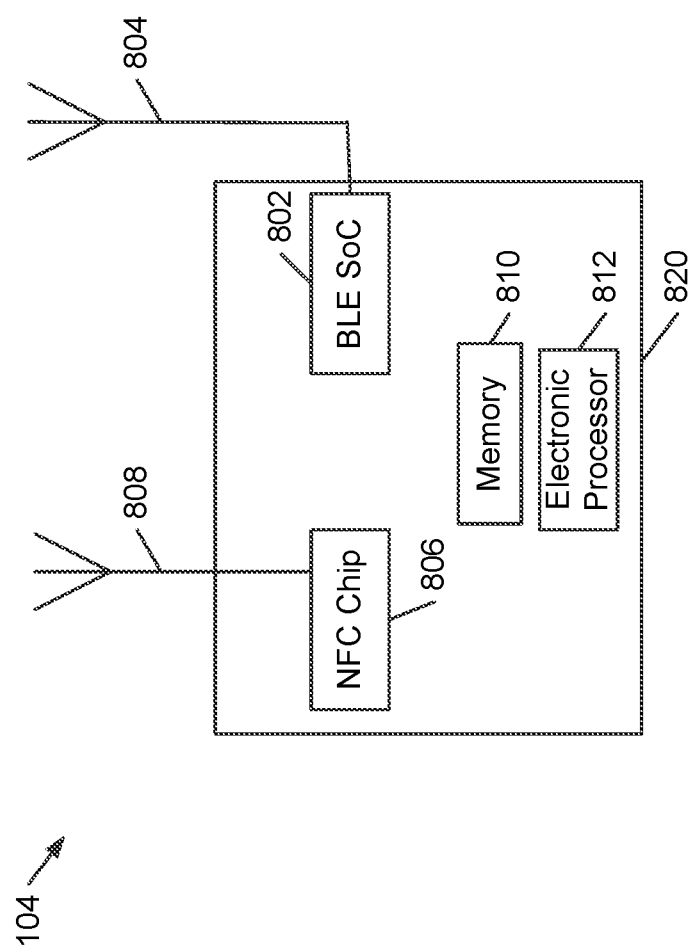
FIG. 5 illustrates a portable communication device including NFC circuitry and a BLE system-on-chip, in accordance with some embodiments.

FIG. 5 is a block diagram of the portable communication device 104 (for example, a smart phone 104A or a key fob 104B) including a BLE SoC 802 coupled to an antenna 804, a NFC chip 806 coupled to an antenna 808, and a memory 810 controlled by an electronic processor 812 within an enclosure 820, in accordance with some embodiments. The memory 810 stores identification data associated with the portable communication device 104 that is used to wirelessly authenticate with the PEPS functionality associated with the vehicle 102. This identification data is transmitted using at least one of the antenna 804 associated with BLE SoC 802 and the antenna 808 associated with the NFC chip 806. In some embodiments, the memory 810 also stores encryption keys or other mechanisms for encrypting data communicated to the vehicle 102. The memory 810 (or a separate memory included in the portable communication device 104) may also store an operating system, such as iOS provided by Apple Inc. or Android, provided by Google LLC. It should be understood that the portable communication device 104 illustrated in FIG. 5 is provided as one example configuration of such a device and the device 104 may include fewer or more components in different configurations or forms than illustrated in FIG. 5 while still providing the functionality described herein as being performed by the portable communication device 104.

One of the security functions performed by a PEPS system 200 is the localization of the portable communication device 104. Accurate localization is important to vehicle security as well as user safety. To localize the portable communication device 104, the localization system 100 consisting of, in one embodiment, the VAS 150, the portable communication device 104, and localization antennae (described below) included in the transceivers work together and based on a set of predefined instructions to be executed by an electronic processor (e.g., the electronic processor 710 included in the VAS 150) to determine a location and/or position of the portable communication device 104 (i.e., with respect to the vehicle 102). In embodiments described and illustrated herein, the VAS 150 (through execution of instructions via the electronic processor 710) detects when the portable communication device 104 is in the vicinity of the vehicle 102 and also differentiates whether the portable communication device 104 is inside the vehicle 102 or outside the vehicle 102. Embodiments provided herein determine the location of the portable communication device 104 using BLE 2.4 GHz (as compared to previously-used frequencies, such as 315/433.92 MHz).

In some embodiments provided herein, the user is not required to interact with the portable communication device 104 in any manner, but is only required to carry the portable communication device 104 on their person. In some embodiments, as the user approaches the vehicle 102, the vehicle 102 (i.e., the VAS 150) attempts to bond or pair with the portable communication device 104 (using known pairing techniques) to perform a sequence of events to authenticate the portable communication device 104 to be a device authorized to access PEPS functionality associated with the vehicle 102. To begin authentication, the portable communication device 104 is required to be within the defined vicinity area around the vehicle 102 to establish a connection sequence. In addition, once authenticated, the portable communication device 104 may be required to be located inside or outside the vehicle 102 to perform particular vehicle operations. For example, to unlock one or more doors of the vehicle 102 or perform other actions with respect to the vehicle 102 that are to be remotely executed, the portable communication device 104 may be required to be located outside the vehicle 102. Similarly, to start an engine of the vehicle 102 or perform other actions with respect to the vehicle 102 that are executed when a user is within the vehicle 102, the portable communication device 104 may be required to be located inside the vehicle 102.

To perform localization, the portable communication device 104 sends out advertisement packets (for example, according to the Bluetooth protocol). The portable communication device 104 transmits the advertisement packets at regular time intervals, and each packet can contain signal strength data (also referred to herein as received signal strength indicator or information (RSSI)). The VAS 150 uses the signal strength data associated with the advertisement packets to localize the portable communication device 104, which can be used to determine when to wake up the transceivers, control operation of PEPS functions, or both. For example, the VAS 150 can determine, based at least in part on the signal strength data, whether the user (carrying the portable communication device 104) is at a required distance with respect to the vehicle 102 and, in some embodiments, can wake up the transceivers 110, 120, 130, 140, 160, 170, 180, and 190, which as described below, are used to further localization the portable communication device 104. Similarly, the VAS 150 can localize the portable communication device 104 to determine whether the device 104 is inside or outside the vehicle 102, which is used to control PEPS functionality. For example, when the user is outside the vehicle 102 and is within close proximity to the vehicle 102 or performs any PEPS functions (touches a door handle), the portable communication device 104 may be localized to confirm that the device 104 is located outside the vehicle 102. Similarly, while the user is inside the vehicle 102 and performs any related PEPS functions (pushes an ignition button to start an engine of the vehicle 102), the portable communication device 104 is again localized to confirm that the portable communication device 104 is present within the boundaries of the vehicle 102 (i.e., within the vehicle body or passenger compartment).

Figure 6:
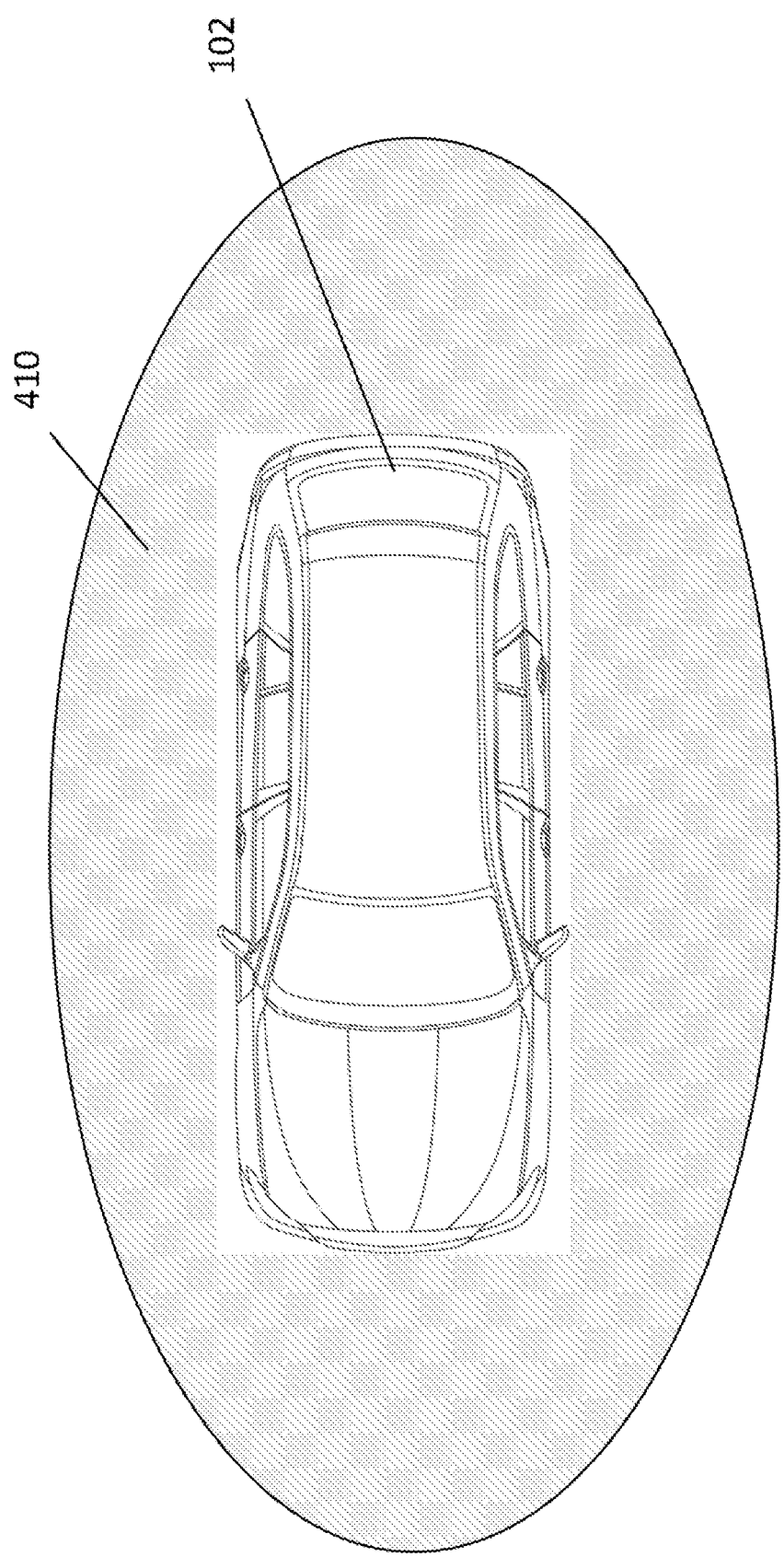
FIG. 6 illustrates an area of interest for localization around the vehicle in FIG. 1, in accordance with some embodiments.
Figure 7:
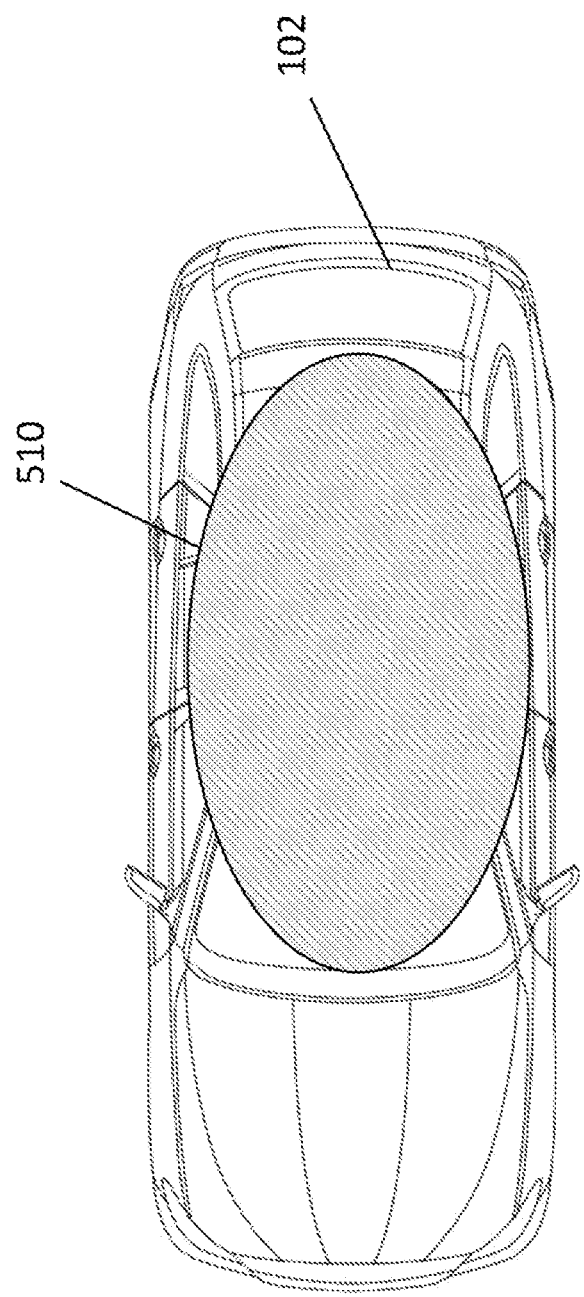
FIG. 7 illustrates an area of interest for localization inside the vehicle in FIG. 1, in accordance with some embodiments.

By way of example only, FIGS. 6 and 7 illustrate shaded areas 410 and 510, respectively, indicating the permissible areas outside and inside the vehicle 102, respectively, in which the user can perform PEPS-related functions. In particular, FIG. 6 illustrates an area of interest including an area 410 around the vehicle 102 shown in FIG. 1 and, as described above, in accordance with some embodiments. The area 410 is configured such that it is substantially close to and includes the outer edges of the vehicle 102. The dimensions of one or both of the areas 410 and 510 may be defined based on a sensitivity of the VAS 150 or a particular signal strength value of data received by the VAS 150. The dimensions of these areas 410 and 510 may also be set based on various standards (e.g., the Thatcham Security System Evaluation 2014 standard) or based on operating requirements or recommendations as set per applicable original equipment manufacturers (OEMs). For example, in some embodiments, the area 410 may extend approximately 1.8 to 2 meters around a perimeter of the vehicle 102. Similarly, a boundary around the vehicle 102 for performing initial pairing or bonding with the device 104 may be defined based on dimensions of the vehicle 102, sensitivity of transceivers included in the vehicle 102, characteristics of BLE advertisements, standards or OEM requirements or recommendations, or a combination thereof. In some embodiments, this pairing boundary is approximately 80 meters to 100 meters.

In some embodiments, in response to the VAS detecting the portable communication device 104 within the area 410, the VAS 150 wakes up the transceivers 110, 120, 130, 140, 160, 170, 180, and 190 from a sleep mode and transitions the transceivers 110, 120, 130, 140, 160, 170, 180, and 190 to enter a normal mode to receive advertisement packets from the portable communication device 104, which, as described below, the VAS 150 uses to determine whether the portable communication device 104 is within the area 410 around the vehicle 102 or within the area 510 within the vehicle 102 (e.g., based on signal strength).

Similarly, FIG. 7 illustrates an area of interest including an area 510 inside the vehicle 102 shown in FIG. 1 and, as described above, in accordance with some embodiments. The area 510 is configured such that it is substantially close to and includes the inner edges associated with the interior of the vehicle 102. The dimensions of the area 510 are defined by the signal strength values received by the VAS 150 from the transceivers 110, 120, 130, 140, 160, 170, 180 and 190.

In some embodiments, when the user comes within the range of the shaded area 410 outside of the vehicle 102 shown in FIG. 6, the portable communication device 104 gets authenticated by VAS 150 via Bluetooth communication to lock and/or unlock at least one door of the vehicle. Once the user enters inside the vehicle 102 and the portable communication device 104 is localized to be inside as shown in the shaded area 510 of FIG. 7, the VAS 150 provides an engine (or motor) start control command to the BCM 204 so that the user can operate the ignition button of the vehicle 102 to start the engine (or other components of the vehicle's powertrain). In some embodiments, the portable communication device 104 is configured to communicate with the VAS 150 over a short range wireless channel to perform the vehicle's PEPS functions after authentication.

As noted above, in some embodiments, localization of the portable communication device 104 in the illustrated embodiment is based on signal strengths values received from one or more of the transceivers 110, 120, 130, 140, 160, 170, 180, and 190 disposed inside and, optionally, outside of the vehicle 102. In some embodiments, a received signal strength indicator (RSSI) is used to measure the received signal power and/or strength of the input signal to the transceivers 110, 120, 130, 140, 160, 170, 180, and 190. The RSSI provides an indication of the power level of a signal received by an antenna. The longer the distance of portable communication device 104 from the transceivers 110, 120, 130, 140, 160, 170, 180, and 190, the lesser the signal strength received at the transceivers 110, 120, 130, 140, 160, 170, 180, and 190.

Figure 8:
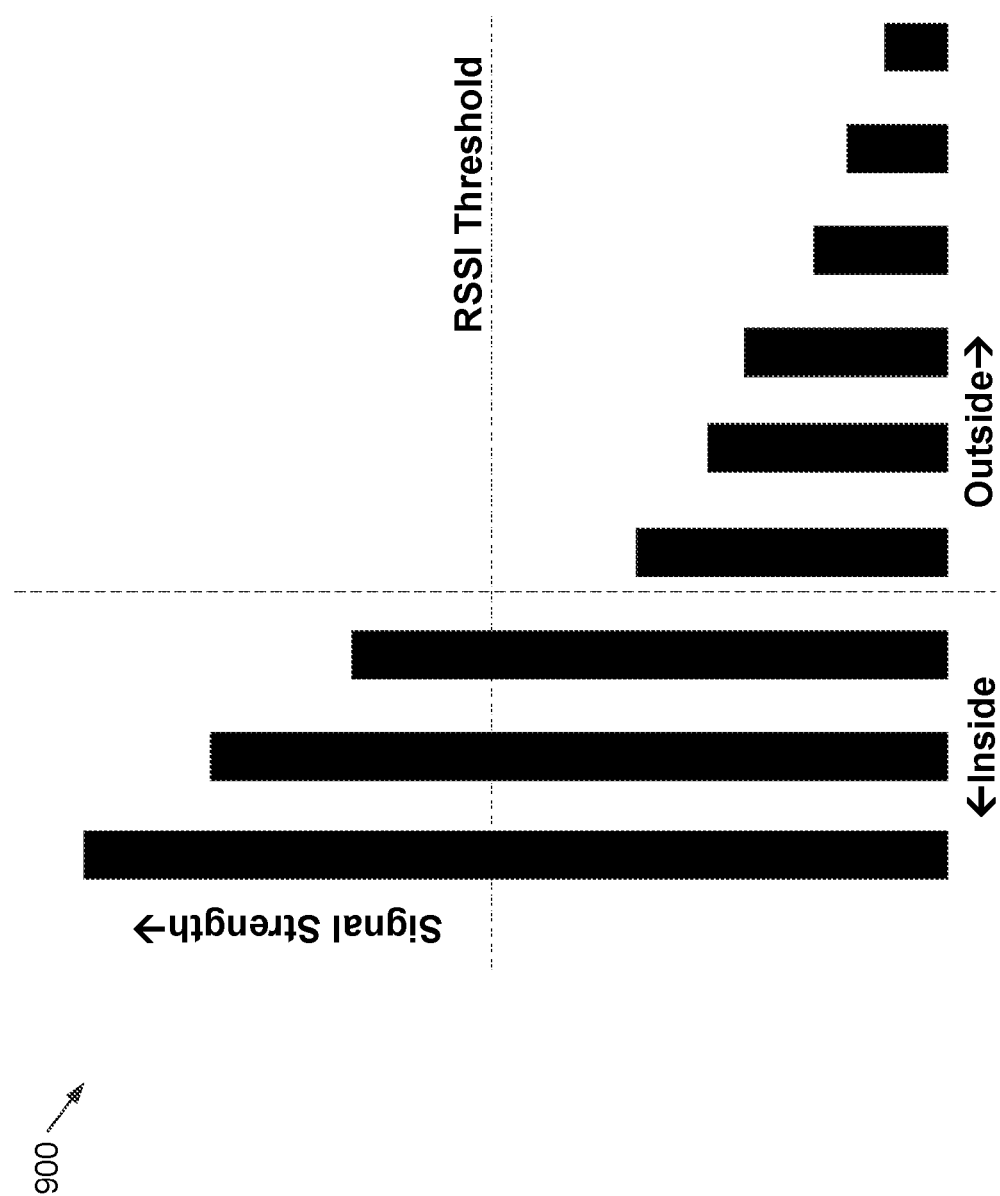
FIG. 8 illustrates a graphical representation of the behavior of signal strength with respect to position of the portable communication device, in accordance with some embodiments.

For example, FIG. 8 illustrates a graphical representation 900 of the behavior of signal strength (represented by the y-axis) with respect to a position of the portable communication device 104 relative to the vehicle 102 (represented by the x-axis), in accordance with some embodiments. As shown in FIG. 8 and described in more detail below with respect to FIGS. 11, 12, and 13, the RSSI threshold value may be used to determine whether the portable communication device 104 is either inside or outside the vehicle 102.

Figure 9:
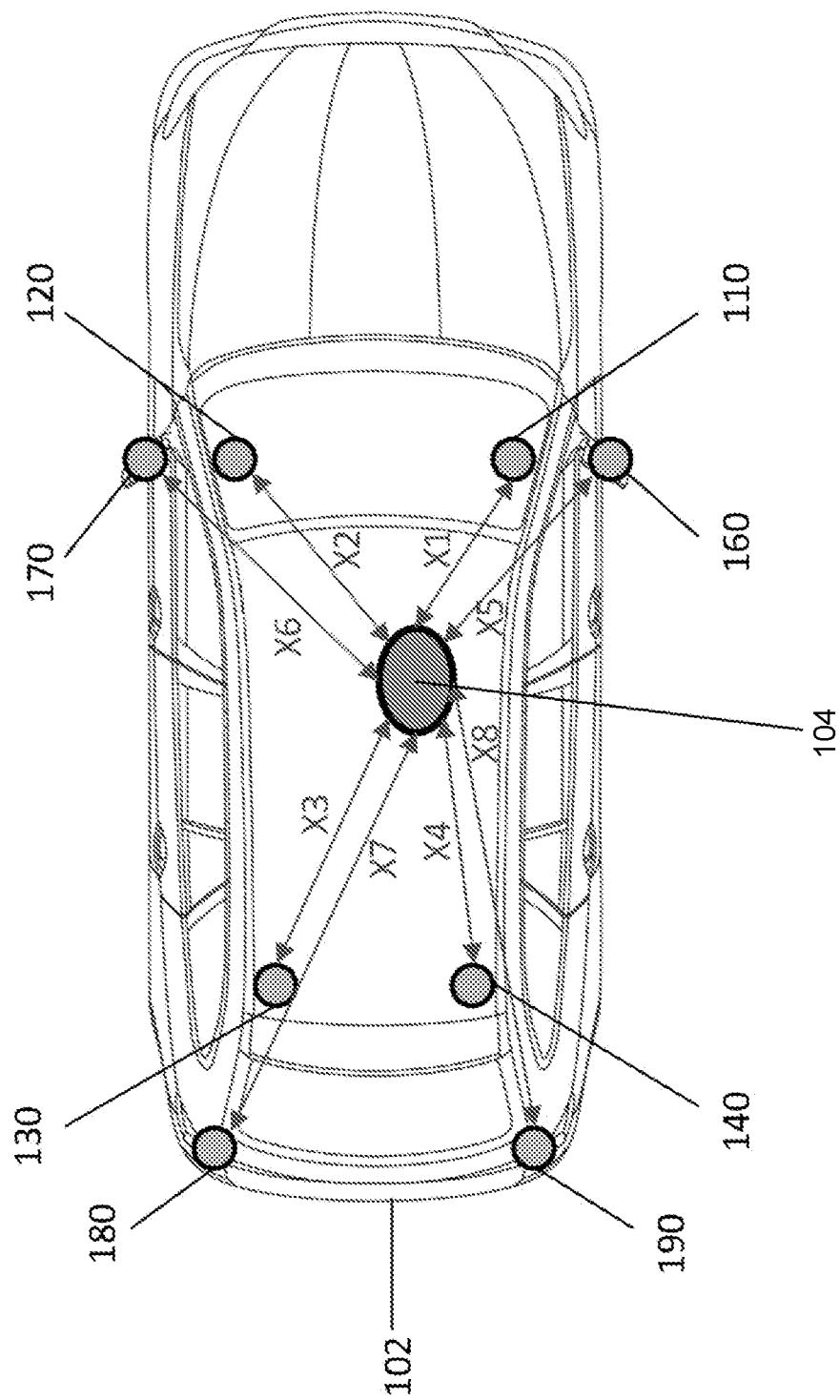
FIG. 9 illustrates a portable communication device located inside the vehicle shown in FIG. 1, wherein X1, X2, X3, X4, X6, X7, and X8 represent physical distances between the portable communication device and the respective localization modules, in accordance with some embodiments.
Figure 10:
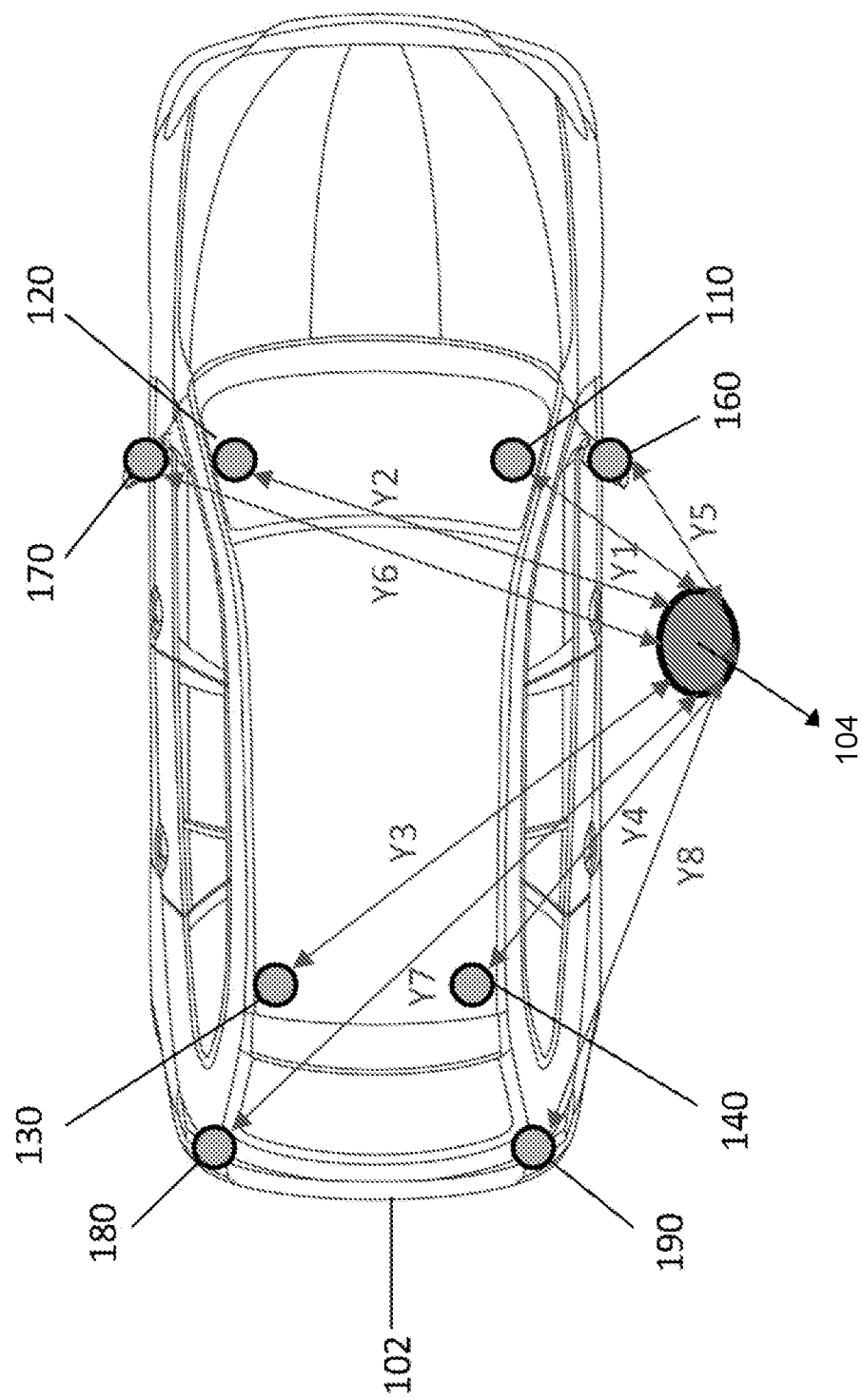
FIG. 10 illustrates a portable communication device when located outside the vehicle shown in FIG. 1, wherein Y1, Y2, Y3, Y4, Y6, Y7, and Y8 represent physical distances between the portable communication device and the respective localization modules, in accordance with some embodiments.

For example, the received signal strengths can be used to determine distances between the portable communication device 104 and each transceiver, which can be used to determine whether the portable communication device 104 is positioned outside or inside the vehicle 102. For example, FIG. 9 illustrates the portable communication device 104 located inside the vehicle 102 shown in FIG. 1, wherein X1, X2, X3, X4, X5, X6, X7, and X8 represent physical distances between the portable communication device 104 and the respective localization modules (transceivers 110, 120, 130, 140, 160, 170, 180, and 190), in accordance with some embodiments. Similarly, FIG. 10 illustrates the portable communication device 104 placed outside the vehicle 102 shown in FIG. 1, wherein Y1, Y2, Y3, Y4, Y5, Y6, Y7, and Y8 represent physical distances between the portable communication device 104 and the respective localization modules (transceivers 110, 120, 130, 140, 160, 170, 180, and 190), in accordance with some embodiments. Accordingly, as the distances between the portable communication device 104 and the transceivers 110, 120, 130, 130, 160, 170, 180, and 190 vary based on whether the portable communication device 104 is positioned inside or outside the vehicle 102, the RSSI values can be used to determine distances and, thus, determine whether the portable communication device 104 is located inside or outside the vehicle 102.

Theoretically, signal strength is inversely proportional to the squared distance, and known radio propagation models can be used to convert the signal strength value into distance. It will be appreciated that factors impacting RSSI values include the transmitted power, receiver sensitivity, type of antenna used (plus cable/connector losses if external antennas are used), orientation of the antenna, physical obstacles to radio wave propagation, and distance between the transmitter and the receiver.

With continued reference to the illustrated embodiment in which the four transceiver wireless modules 110, 120, 130, and 140 are located inside the vehicle (with one at each of four corners within the interior of the vehicle 102), the four wireless modules 110, 120, 130, and 140 scan for the portable communication device 104 from which RSSI values may be obtained. These four wireless transceivers 110, 120, 130, and 140 update the received RSSI values to the VAS 150 through either wired or wireless connections. The RSSI values received at VAS 150 are used to calculate the distance of the portable communication device 104 from the respective wireless transceivers 110, 120, 130, and 140. By mapping RSSI values of the four wireless transceivers 110, 120, 130, and 140, a calculated intersection point can be determined, which represents a determined location of the portable communication device 104. The distance between two points (i.e., the portable communication device 104 and any of the wireless transceivers 110, 120, 130, and 140) can be calculated by using the following distance formula for the coordinate system:

$$\text{Distance between a first point}(x1,y1,z1) \text{ and a second point}(x2,y2,z2) = \sqrt{(x2-x1)^2+(y2-y1)^2+(z2-z1)^2}$$

where x1, x2 are coordinates along the x-axis, y1, y2 are coordinates along the y-axis, and z1, z2 are coordinates along the z-axis.

Due to the uncertainty of RSSI values as a result of environment and other practical difficulties, some enhancements can be made to make RSSI values more accurate. For example, signal attenuation by car or signal loss occurs even as the signal passes through air. The loss of signal strength is more pronounced as the signal passes through different objects. The typical value for signal attenuation for a metal vehicle body is 5 dB. Free Space Path Loss (FSPL) is the attenuation of the electromagnetic wave while propagating through space.

$$FSPL = 32.4 + 20*\log(F) + 20*\log(d)$$

where "F" is the radio frequency expressed in MHz, and "d" is the distance between the transmitting and receiving antennas.

In embodiments in which inconsistencies of RSSI values exist due to the surrounding environment, obstacles around the vehicle 102, interference caused by other devices, and other practical difficulties, the systems and methods provided herein may be enhanced by providing threshold limits of RSSI values for each of the four internal transceiver modules as well as through use of additional transceivers and additional processing of signal data provided by the transceivers, such as the addition of an offset value for the RSSI values for each of the four external transceivers 160, 170, 180, and 190 (described below with respect to FIGS. 11, 12, and 13) thereby localizing the portable communication device 104 with greater accuracy.

It should be understood that the number and configuration of transceivers included in the vehicle 102 may vary from the illustrations and descriptions herein. For example, additional transceivers may be used to increase the accuracy of localization of the portable communication device 104 according to any of the localization embodiments and methods disclosed herein. The placement of these additional transceivers can be either inside or outside the vehicle 102. Also, such transceivers can have directional or omnidirectional antennas as desired above. These additional transceivers can also be placed in a sleep mode at various times during, before, and/or after localization operations described and illustrated herein. For example, in some embodiments, the VAS 150 is configured to activate all or a subset of transceivers associated with the vehicle based at least in part on various triggers, such as, for example when the portable communication device 104 is authenticated by the vehicle 102, an ignition status of the vehicle 102, door status of the vehicle 102, a brake status of the vehicle 102, a clutch status of the vehicle 102, or a combination thereof. In response to activation by the VAS 150, each transceiver enters a normal mode to receive advertisement packets transmitted by the portable communication device 104, which, as described above, are used by the VAS 150 to determine whether the portable communication device 104 is either inside or outside the vehicle 102. A transceiver may remain in a normal mode until one or more events occur, such as a time-out event, a disconnection of the portable communication device 104, the performance of a particular vehicle function, or the like.

For example, in some embodiments, the VAS 150 is configured to wake up all transceivers associated with the vehicle 102 in response to a successful pairing and authentication of the portable communication device 104. However, in other embodiments, the VAS 150 is configured to wake up only a subset of transceivers in response to authentication of the portable communication device 104 and may wake up other transceivers in response to other events to provide accurate localization while minimizing resource usage. For example, when the door of the vehicle 102 is opened and closed, the VAS 150 can trigger one or more additional transceivers to wake up from sleep mode and transition into normal mode to interact with the portable communication device 104 (i.e., receive packets including signal strength data from the portable communication device 104). Similarly, in other embodiments, when the VAS 150 determines one or more RSSI values below an expected threshold associated with the inside area 510, the VAS 150 can wake up one or more additional transceivers to determine the location of the portable communication device 104 as being inside or outside the vehicle 102. In some embodiments, the VAS 150 may also wake up one or more transceivers as part of a calibration process for the PEPS 200.

The particular number and configuration of transceivers associated with the vehicle 102 may also depend on a desired level or accuracy of localization (e.g., localizing the portable communication device 104 inside and outside the vehicle 102 from all the directions to give full coverage to the user to perform PEPS), the type of the vehicle 102, the size of the vehicle 102, the placement of transceivers, or a combination thereof.

However, regardless of the particular configuration or number of transceivers used, the VAS 150 may be configured to perform a calibration process of the transceivers to properly configure the PEPS 100 and accurately determine the portable communication device 104 is inside or outside the vehicle 102. For example, in some embodiments, this calibration can be performed in response to an initial successful pairing with the vehicle 102 (the VAS 150) using the Bluetooth protocol. The calibration process can involve placing the portable communication device 104 at one or more pre-defined locations with respect to the vehicle 102 (e.g., in the interior area of the vehicle 102, outside of the vehicle 102, or a combination thereof), and having the portable communication device 104 communicate with one or more transceivers placed inside or outside the vehicle 102. RSSI values associated with the signals received by the transceivers from the portable communication device 104 are stored, which can be used to set one or more thresholds applied by the VAS 150 during the localization process.

Proper calibration of the portable communication device 104 can also depend on the inside temperature of the vehicle 102. As the localization system 100 is exposed to varying temperatures, such temperatures or temperature fluctuations can impact the performance of a transceiver associated with the vehicle 102 while communicating with the portable communication device 104. Accordingly, in some embodiments, the VAS 150 includes a temperature sensor that measures the internal temperature of the vehicle 102 and the VAS 150 uses the temperature sensor data to calibrate the RSSI threshold values for two or more different temperature conditions. In some embodiments, the VAS 150 may utilize data from an existing temperature sensor within the vehicle 102 to calibrate the RSSI threshold values for various temperature conditions.

In some embodiments, the localization system 100 (the VAS 150) also utilizes sensor data from the portable communication device 104 to identify or verify the location of the portable communication device 104. For example, sensor data read from the portable communication device 104 can be data associated with a proximity sensor within the portable communication device 104. This data from the proximity sensor may be used to identify a location of the portable communication device 104, such as when the portable communication device 104 is in the pocket of a user or while the user is holding the portable communication device 104 near the user's ear (e.g., while on a telephone call). In some embodiments, data from the proximity sensor is accessed by the VAS 150 only in response to low signal strength data associated with one or more transceivers associated with the vehicle 102. For example, the VAS 150 may access proximity sensor data when a low RSSI value is received from each of the transceivers 110, 120, 130, and 140 when the portable communication device 104 is inside the vehicle 102 and when a low RSSI value is received from each of the transceivers 160, 170, 180 and 190 when the portable communication device 104 is outside the vehicle 102. Using the proximity sensor data supports the VAS 150 decision making process to confirm the location of the portable communication device 104, such as inside the user's pocket, inside a bag, being held by the user closer to the ear during telephonic call, or the like.

In an embodiment where four wireless modules are positioned inside the vehicle, the VAS 150 of the illustrated embodiment receives the RSSI values from these four wireless modules disposed inside the vehicle 102, which are then compared with various predetermined thresholds (for example, Th1, Th2, Th3) to identify whether the portable communication device 104 is inside or outside the vehicle 102. In some embodiments, for accurate determination of the location of the portable communication device 104 as to whether the portable communication device 104 is inside or outside the vehicle 102, a minimum of three antennae, each of which is coupled to a transceiver, may be required. In some embodiments, to declare the position of the portable communication device 104 to be inside the vehicle 102, the following conditions must be satisfied: first, a minimum of one RSSI value must be greater than Th1 (highest threshold value); second, a minimum of one RSSI value must be greater than Th2 (mid threshold value); and third, a minimum of one RSSI value must be greater than Th3 (lowest threshold value). If any one of the above conditions is not met in this example, the VAS 150 determines that the portable communication device 104 is positioned outside the vehicle 102. In some embodiments, multiple sets of threshold values may be maintained corresponding to various types of portable communication devices and/or based on various areas associated with the interior and exterior dimensions of the vehicle 102. In some embodiments, the set of thresholds may be determined based at least in part on the unique ID (defined by the firmware) assigned to each portable communication device 104.

Figure 11:
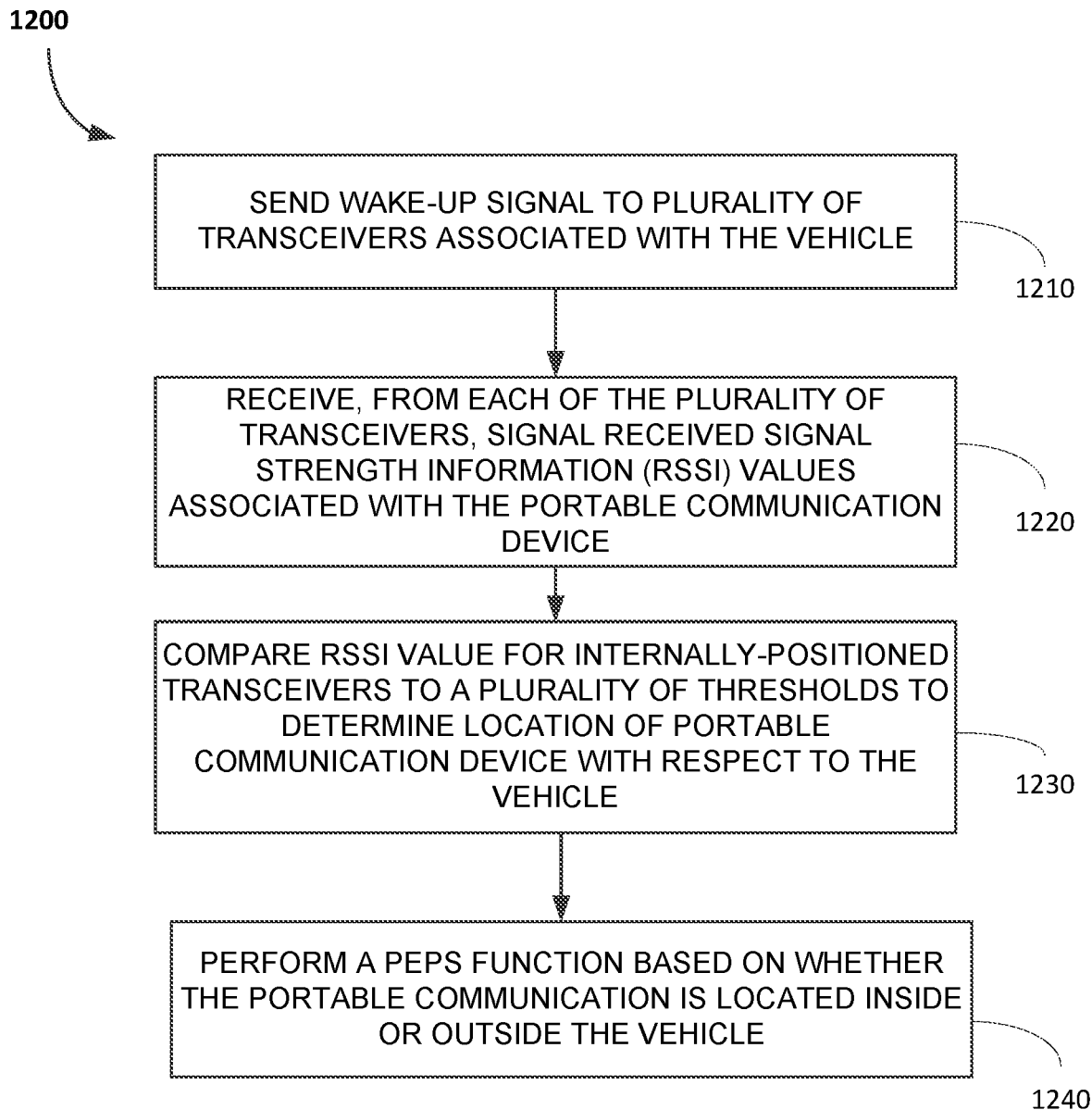
FIG. 11 is a flow chart of a method for providing passive entry and passive start in a vehicle, in accordance with some embodiments.

For example, FIG. 11 is a flow chart of a method 1200 for providing passive entry and passive start (PEPS) in the vehicle 102, in accordance with some embodiments. The method 1200 is described herein as being performed by the VAS 150 (i.e., the electronic processor 710). However, it should be understood that this functionality may be combined or distributed in various ways. For example, in some embodiments, at least a portion of the method 1200 may be performed by a transceiver rather than the VAS 150.

In operation, and with reference to the method 1200 illustrated in FIG. 11 and the earlier figures described above, the VAS 150 sends a wake-up signal to each of a plurality of transceivers associated with the vehicle 102 (block 1210). In some embodiments, the VAS 150 sends the wake-up signals in response to authenticating the portable communication device 104. For example, in response to the portable communication device 104 (carried by the user) coming sufficiently into the vicinity of the vehicle 102 (e.g., within the area 410), the portable communication device 104 sends a challenge request to the VAS 150 using short range wireless communication (for example, using a Bluetooth signal). In some embodiments, the VAS 150 responds to the challenge by sending an interrogative signal to the portable communication device 104, which the portable communication device 104 validates. When the interrogative signal has been validated, the portable communication device 104 sends an encrypted code to the VAS 150. In response to receiving the encrypted code from the portable communication device 104, the VAS 150 performs localization (as described below) of the portable communication device 104. The VAS 150 may then be configured to perform a PEPS function in response to a proper localization of the portable communication device 104. For example, in response to proper localization of the portable communication device 104 for the requested function, the VAS 150 communicates with the BCM 204 to initiate any of the vehicular actions described herein. Some embodiments of the vehicular actions include locking/unlocking the door (passive entry), starting the engine (passive start), of the vehicle 102, and the like. It should be understood that other methodology for authenticating the portable communication device 104 may be used before performing the localization as described herein and this authentication is not limited to the specific functionality described herein.

As described above, the localization process can include receiving, from each of the plurality of transceivers, signal strength data (RSSI values) associated with the portable communication device 104 (block 1220 of FIG. 11). In particular, the transceivers 110, 120, 130, 140, 160, 170, 180, and 190 receive advertisement packets from the portable communication device 104 via the antennae associated with these transceivers.

The VAS 150 then compares, for each of the transceivers 110, 120, 130, and 140, the signal strength data with an associated threshold signal strength value as described above to perform a localization of the portable communication device 104 and determine whether the portable communication device 104 is located inside or outside the vehicle 102 (block 1230 of FIG. 11). The VAS 150 also performs (passively) a PEPS function based on whether the portable communication device 104 is located inside or outside the vehicle 102 (block 1240 of FIG. 11).

For example, when the portable communication device 104 is in the vicinity of the vehicle 102 (and is authenticated), the localization system 100 goes into a wake-up mode and begins to scan the area for the portable communication device 104 and localize the portable communication device 104 (e.g., based on received RSSI values). The localization system 100 can then control what PEPS functions are allowed based on the determined positon of the portable communication device 104. For example, in response to the portable communication device 104 being localized to be inside the vehicle 102, the VAS 150 may allow the user to start the engine and/or can send an engine start control command to the BCM 204. It should be understood that the VAS 150 may be configured to repeat the localization process described above each time a request to perform a PEPS functionality is received from the portable communication device 104. Alternatively or in addition, the VAS 150 may perform the localization at a predetermined frequency or in response to other triggers.

In response to the portable communication device 104 moving out of range from the shaded area 410 around the vehicle 102 (see FIG. 6), the localization system 100 can go into a sleep mode. Also, in some embodiments, when the vehicle 102 is in a running state and the portable communication device 104 is intentionally or unintentionally moved out of the vehicle 102, the localization system 100 can be configured to indicate that the portable communication device 104 is outside the vehicle 102, can disable one or more functions of the vehicle 102 (e.g., door locks, engine or motor operation, and the like), and can continue scanning for the portable communication device 104. In such conditions in these and other embodiments, the localization system can immediately enter a sleep mode, or can do so following a timed delay.

As described above with respect to FIG. 11, the VAS 150 localizes the portable communication device 104 (after authenticating the device 104) to determine whether the device 104 is inside or outside of the vehicle 102 (e.g., within the area 410 or the area 510) to control whether to allow the portable communication device 104 to perform particular functions with respect to the vehicle 102. As described above, the VAS 150 may compare RSSI values to thresholds to perform the localization. Alternatively, the VAS 150 may perform localization using the method 300 illustrated in FIGS. 12 and 13. In particular, FIGS. 12 and 13 is a flow chart illustrating a method 300 for providing localization (and portable communication device authentication) performed by the PEPS system 200 shown in FIG. 1 and FIG. 2 in accordance with some embodiments (e.g., as part of or in place of block 1230 of FIG. 11).

Figure 12:
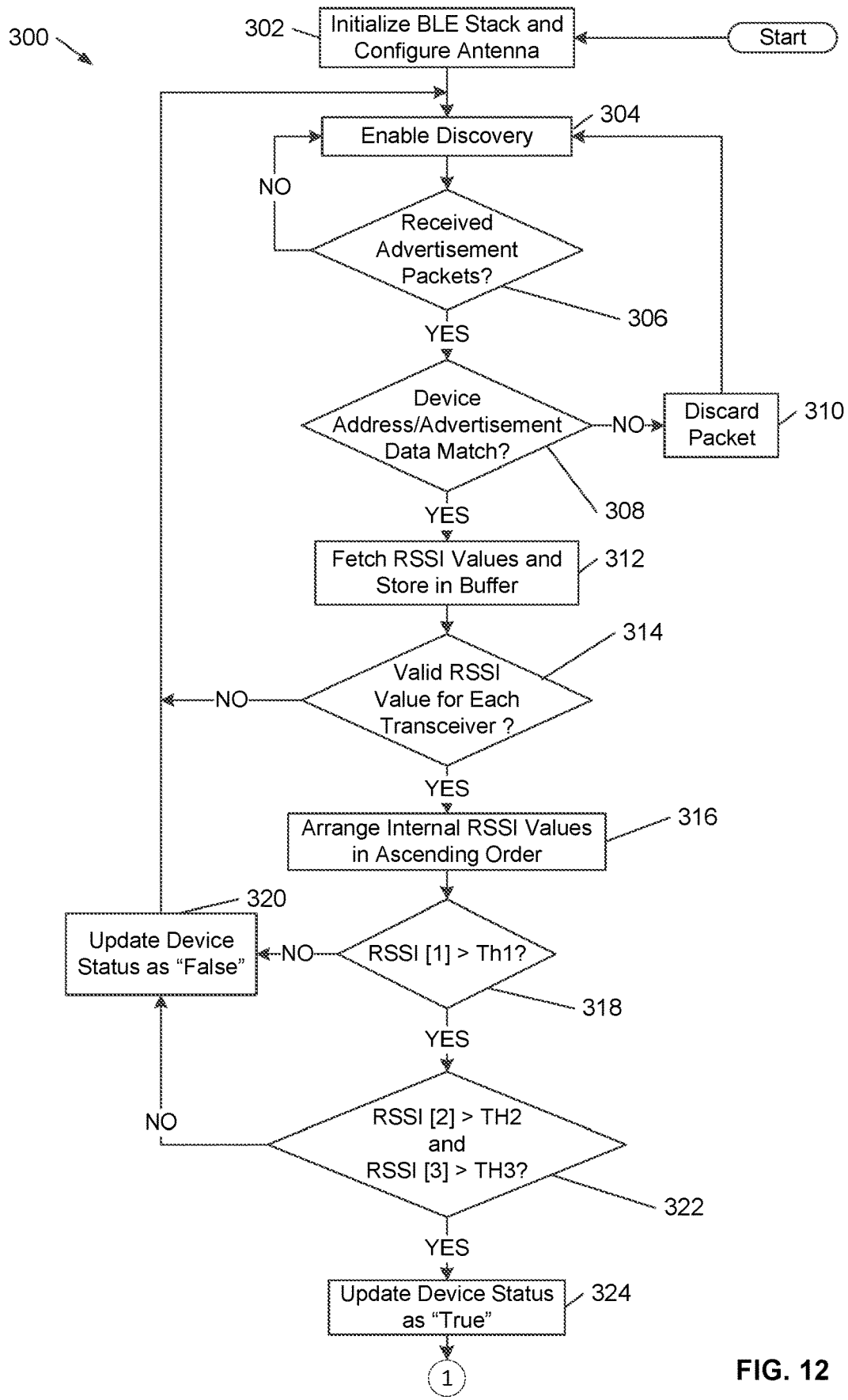
FIGS. 12 and 13 is a flow chart illustrating a method for providing localization performed by the PEPS system of FIG. 2 in accordance with some embodiments.
Figure 13:
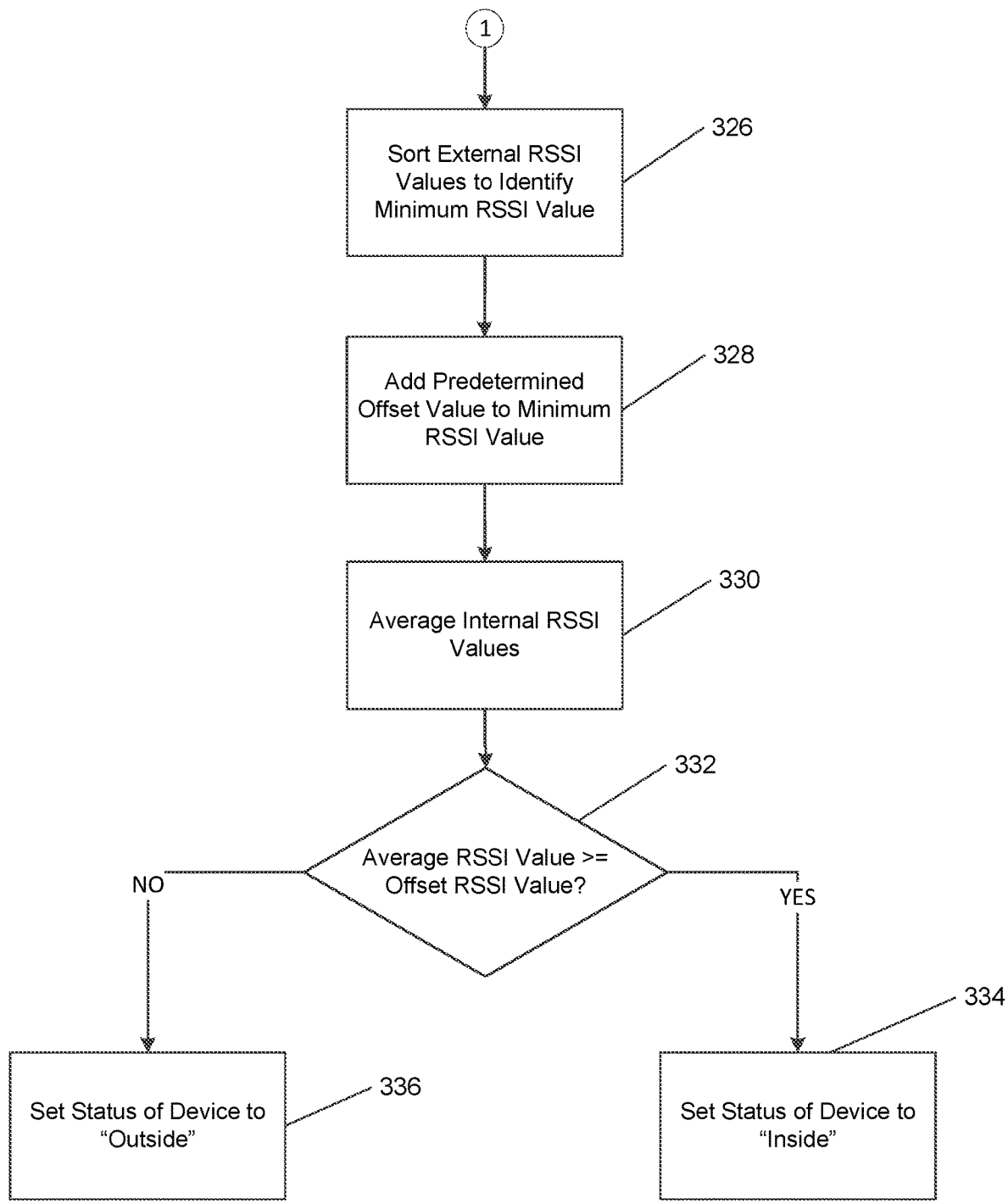

As illustrated in FIG. 12, at block 302, the VAS 150 initializes the BLE stack and configures the transceivers 110, 120, 130, and 140. At block 304, the VAS 150 is enabled to discover data received from the portable communication device 104. At block 306, the VAS 150 determines whether advertisement packets have been received from the portable communication device 104. At block 306, when the VAS 150 determines that advertisement packets associated with the portable communication device 104 have not been received, the method 300 proceeds back to block 304.

Alternatively, at block 306, when the VAS 150 determines that the advertisement packets have been received, the method 300 proceeds to block 308. At block 308, the VAS 150 determines whether there is a match between the device address (for example, identification data) of the portable communication device 104 (such as the smart phone 104A, the key fob 104B or any other handheld or wearable device) and the advertisement packet sent by the portable communication device 104. The device address can be stored in the memory 208 within the vehicle 102. In response to a match between the device address stored in the memory 208 and the advertised packets received from the portable communication device 104, the method 300 proceeds to block 312. In response to the lack of match between the device address stored in the memory 208 and the advertised packets received from the portable communication device 104, the method 300 proceeds to block 310. At block 310, the received advertised packets are discarded, and the method 300 proceeds back to block 304 to resume discovery of additional advertisement packets.

At block 312, the VAS 150 is configured to fetch RSSI values from the internally-positioned transceivers 110, 120, 130, and 140 and store the received RSSI values in a buffer, such as the memory 208. At block 314, the VAS 150 is configured to determine whether the retrieved RSSI value from each of the internal transceivers 110, 120, 130, and 140 is valid. When the retrieved RSSI value(s) from of one or more of the transceivers 110, 120, 130, and 140 are determined not to be valid, then the method 300 proceeds back to block 304. In some embodiments, the validity of a RSSI value is determined based at least in part on receiver sensitivity of the transceivers 110, 120, 130 and 140. When the received signal strength at any of the transceivers 110, 120, 130, and 140 is lower than the receiver sensitivity of the transceiver, then the received signal will be identified as not valid. Alternatively, when the received signal at the transceiver is within the receiver sensitivity range of the transceiver, the received signal is determined to be valid.

When the retrieved RSSI values from the transceivers 110, 120, 130, and 140 are determined to be valid, the method 300 proceeds to block 316. At block 316, the VAS 150 arranges the received RSSI values in ascending order. The method 300 further proceeds to block 318, where a first RSSI value (in the ascending order) is compared to a first threshold (Th1) stored in memory 208. When the first RSSI value is less than the first threshold (Th1), the method 300 proceeds to block 320. At block 320, the VAS 150 sets the status of the portable communication device 104 to "False." As illustrated in FIG. 12, in this embodiment, setting the status of the device 104 to "False" based on the first RSSI value may result in a determining that the portable communication device 104 is not located within the vehicle 102 and, thus, is not authorized to access the PEPS functionalities associated with the vehicle 102. Accordingly, in this embodiment, the method 300 further proceeds from block 320 to block 304 to resume discovery of other portable communication devices trying to communicate with the vehicle 102.

As illustrated in FIG. 12, at block 318, when the first RSSI value is greater than the first threshold (Th1), the method 300 proceeds to block 322. At block 322, a second RSSI value (within the ascending order) is compared to a second threshold (Th2) and a third RSSI value (within the ascending order) value is compared to a third threshold (Th3). When the second RSSI value is determined to be less than the second threshold (Th2) or the third RSSI value is determined to be less than the third threshold (Th3), the method 300 proceeds to block 320 wherein, as described above, the status of the device 104 is set to "False." Alternatively, when the second RSSI value is greater than the second threshold (Th2) and the third RSSI value is greater than the third threshold (Th3), the method proceeds to the block 324. At block 324, the method 300 updates the status of the portable communication device 104 attempting to communicate with vehicle 102 as being within the vehicle 102 (set to "True," which indicates that, based on the signals received from the internally-positioned transceivers, the portable communication device 104 is located within the vehicle 102).

As described above with respect to FIG. 12, in some embodiments, when a RSSI value fails to satisfy a threshold, the method 300 sets the vehicle status to "False" and starts the discovery process over. In other embodiments, however, the status may be set to "False" when a RSSI value fails to satisfy a threshold, but the method 300 may continue to check additional thresholds, wherein, this "False" status may be updated based on the results of comparing other RSSI values to this or other thresholds. Accordingly, setting the status of the device 104 may be akin to setting a status in a buffer, which may be overridden during further processing. Similarly, in some embodiments, a status may be set for one or more of the internal RSSI values to track whether particular RSSI values satisfy thresholds.

In particular, in some embodiments, when a predetermined percentage (e.g., three out of four) of the RSSI values satisfy the thresholds (e.g., Th1, Th2, and Th3), the status of the device 104 may be set to "True" (representing a position of the device 104 inside the vehicle 102). Alternatively, if these thresholds are not met by this predetermined percentage of RSSI values (e.g., no three RSSI values satisfy these thresholds), then the status of the device 104 may be set to "False" (representing a position of the device outside of the vehicle 102). For example, when only two of the four available RSSI values meet any of the three thresholds (Th1, Th2, and Th3) (the other two do not satisfy any of these thresholds), the status may be set to "False," indicating that the device 104 is located outside of the vehicle 102. Accordingly, in some embodiments, all four internal RSSI values may be compared to all or at least one of the three thresholds to set the vehicle status. For example, in situations where the third (in ascending order) RSSI value fails to meet the third threshold Th3, the fourth (in ascending order) RSSI value may also be compared with the third threshold Th3 to determine whether at least three of the RSSI values satisfy the thresholds.

In some embodiments, the VAS 150 uses the status of the device 104 set based on the method 300 illustrated in FIG. 12 (i.e., "True" or "False") to determine whether the device 104 is located inside or outside of the vehicle 102 (and, thus, whether to allow activation of various PEPS functions). However, in some embodiments, the VAS 150 performs additional processing to verify the position of the portable communication device 104 determined based on signals received from the four internal transceivers (e.g., transceivers 110, 120, 130, and 140). For example, as illustrated in FIGS. 12 and 13, before allowing the portable communication device 104 to access the PEPS functionalities (after setting the status of the device 104 to "True"), the VAS 150 also processes signals received from the externally-positioned transceivers (160, 170, 180, and 190) to verify whether the portable communication device 104 is located within the vehicle 102.

In particular, as illustrated in FIG. 13, the VAS 150 also receives (e.g., fetches, stores, and validates these values as described above for the RSSI values from the internal transceivers) RSSI values from four wireless modules disposed external to the vehicle 102 (e.g., transceivers 160, 170, 180, and 190) and sorts the received external RSSI values to find the minimum RSSI value (at block 326). The VAS 150 then adds a predetermined offset value to the identified minimum RSSI (at block 328). The VAS 150 uses the resulting RSSI value as an offset RSSI value, which the VAS 150 uses as an additional factor to determine whether the portable communication device 104 is inside or outside the vehicle 102. For example, as illustrated in FIG. 13, the VAS 150 averages the RSSI values from the four internally-positioned transceivers (e.g., transceivers 110, 120, 130, and 140) (at block 330). The VAS 150 then compares the offset RSSI value with the averaged RSSI (at block 332). When the averaged RSSI value is greater than or equal to the offset RSSI value (at block 332), the VAS 150 determines that the portable communication device 104 is inside the vehicle 102 (at block 334). Alternatively, when the averaged RSSI value is less than the offset RSSI value (at block 332), the VAS 150 determines that the portable communication device 104 is outside the vehicle 102 (at block 336). In some embodiments, the offset value added to the minimum RSSI value varies based on the vehicle 102 type and size. In some embodiments, the VAS 150 performs one or more calibrations to determine the offset value.

It should be understood that the VAS 150 may determine or verify a position of the portable communication device 104 with respect to the vehicle 102 using various methodologies. For example, in some embodiments, the VAS 150 may use only the threshold methodology illustrated in FIG. 12 without also using the average offset methodology as illustrated in FIG. 13. Similarly, in some embodiments, the VAS 150 may use only the average offset methodology without also using the threshold methodology. Also, as described above, the VAS 150 may perform the average offset methodology after initially performing the threshold methodology to give precedence to the results of the average offset value. However, in other embodiments, the VAS 150 may perform the threshold methodology after initially performing the average offset methodology to give precedence to the results of the threshold methodology. Also, in some embodiments, the results of the threshold methodology and the average offset methodology may be compared, weighted, or otherwise processed in other ways than those described above. Furthermore, in some embodiments, the VAS 150 may use the presence or absence of signals received by one or more transceivers associated with the vehicle 102 to determine whether the portable communication device 104 is positioned within or outside of the vehicle 102. Similarly, the VAS 150 may calculate distances between the portable communication device 104 and the transceivers to determine a position of the portable communication device 104 (as compared to merely comparing RSSI values).

Figure 14:
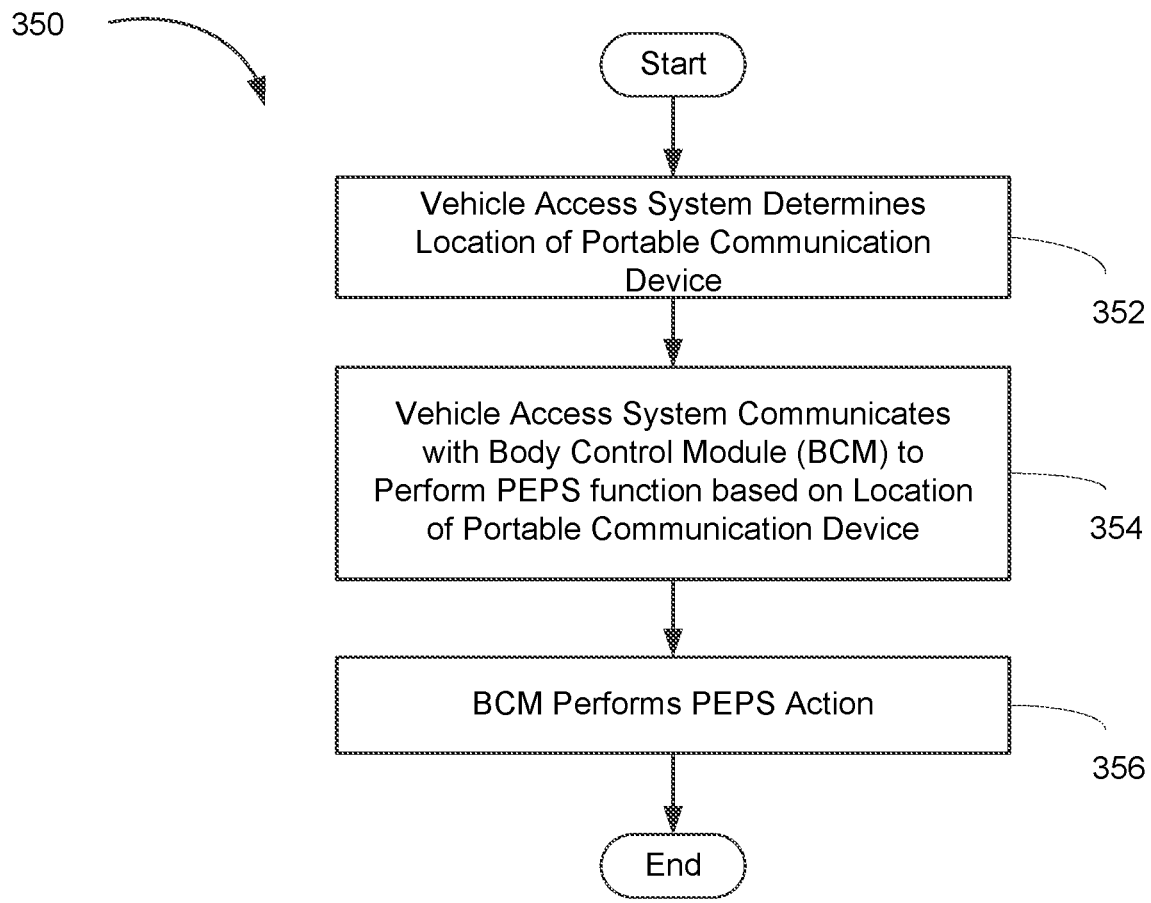
FIG. 14 is a flow chart illustrating a method for providing PEPS functionality associated with the vehicle shown in FIG. 1, in accordance with some embodiments.

Depending on the determined position of the portable communication 104, the VAS 150 may take various actions to provide PEPS functionality. For example, FIG. 14 is a flow chart illustrating a method 350 for providing PEPS functionality associated with the vehicle 102 shown in FIG. 1, in accordance with some embodiments. As illustrated in FIG. 14, at block 352, the VAS 150 determines the location of the portable communication device 104 (such as using the method 300 illustrated in FIGS. 12 and 13). After determining the location of the portable communication device 104, the method 350 proceeds further to block 354. At block 354, the VAS 150 communicates with the BCM 204 and in turn to the electronic control unit 206 to take the various steps (PEPS functions) based on the location of the portable communication device 104. In some embodiments, the various steps taken by BCM 204 (e.g., via the electronic control unit 206) based on the location of the portable communication device 104 includes locking and/or unlocking the doors, turning the ignition ON and/or OFF, and/or opening the trunk of the vehicle 102 (at block 356). It should be understood that if the location of the portable communication device 104, as determined by the VAS 150, is not a position where particular PEPS functionality is allowed, the VAS 150 may not take any steps or actions and, thus, may deny a request for particular PEPS functionality as submitted by the portable communication device 104.

Thus, embodiments provide, among other things, systems and methods for localization of a portable communication device and providing PEPS functionality in a vehicle. For example, one embodiment provides a system for controlling an operation of a vehicle using a portable communication device. The system comprises a plurality of transceivers associated with the vehicle and a vehicle access system coupled to each of the plurality of transceivers. The vehicle access system configured to send a wake-up signal to each of the plurality of transceivers, receive, via each of the plurality of transceivers, signal strength data associated with the portable communication device using a Bluetooth signal received at an antenna associated with each of the plurality of transceivers, compare, for each of the plurality of transceivers, the signal strength data with a threshold signal strength value, in response to comparing the signal strength data received from each of the plurality of transceivers to the threshold signal strength value, perform a localization of the portable communication device generating the Bluetooth signal to determine whether the portable communication device is located inside or outside the vehicle, and perform the operation based on whether the portable communication device is located inside or outside the vehicle.

In some embodiments, the vehicle access system is configured to perform the localization of the portable communication device to determine whether the portable communication device is located inside or outside the vehicle by arranging the signal strength data received from each of the plurality of transceivers in ascending order, comparing a first signal strength in the ascending order to a first threshold, comparing a second signal strength value in the ascending order to a second threshold, comparing a third signal strength in the ascending order to a third threshold, and determining that the portable communication device is located inside the vehicle in response to the first signal strength exceeding the first threshold, the second signal strength value exceeding the second threshold, and the third signal strength value exceeding the third threshold.

In some embodiments, the threshold signal strength value for each of the plurality of transceivers is based on a dimension of the vehicle.

In some embodiments, the plurality of transceivers includes four transceivers positioned at four corners within an interior of the vehicle.

In some embodiments, the plurality of transceivers includes a first plurality of transceivers positioned within the vehicle and further comprising a second plurality of transceivers positioned on an exterior surface of the vehicle. In these embodiments, the vehicle access system may be further configured to receive, via each of the second plurality of transceivers, signal strength data associated with the portable communication device using a Bluetooth signal received at an antenna associated with each of the second plurality of transceivers, sort the signal strength data received from each of the second plurality of transceivers to determine a minimum signal strength value, add an offset to the minimum signal strength value to generate an offset signal strength value, average the signal strength data received from each of the first plurality of transceivers to determine an average signal strength value, and compare the offset signal strength value to the average signal strength value, wherein the vehicle access system is configured to perform the localization of the portable communication device to determine whether the portable communication device is located inside or outside the vehicle in response to comparing the signal strength received from each of the first plurality of transceivers to the threshold signal strength value and in response to comparing the comparing the offset signal strength value to the average signal strength value.

In some embodiments, the vehicle access system is also further configured to receive a challenge request from the portable communication device, and send an interrogative signal in response to the challenge request from the portable communication device. In these embodiments, the vehicle access system is also further configured to receive an encrypted code from the portable communication device, and wherein the vehicle access system is configured to perform the operation based on whether the portable communication device is located inside or outside the vehicle and based on the encrypted code.

In some embodiments, the vehicle access system is configured to calibrate the plurality of transceivers based at least in part on placing the portable communication device at a pre-defined location with respect to the vehicle.

In some embodiments, the operation includes at least one selected from a group consisting of locking the vehicle, unlocking the vehicle, and starting an engine or motor the vehicle.

In some embodiments, at least one of the plurality of transceivers includes a Bluetooth low energy (BLE) module.

In some embodiments, the portable communication device is selected from a group consisting of a handheld device and a wearable device. The handheld device may include an item selected from the group consisting of a smart phone and a key fob, and the wearable may include an item selected from the group consisting of a smart watch and a health monitoring device.

Another embodiment provides a method of passively performing an operation of a vehicle via a portable communication device. The method comprises sending, with an electronic processor, a wake-up signal to each of a plurality of transceivers associated with the vehicle, receiving, with the electronic processor, via each of the plurality of transceivers, signal strength data associated with the portable communication device using a Bluetooth signal received at an antenna associated with each of the plurality of transceivers, comparing, with the electronic processor, for each of the plurality of transceivers, the signal strength data with a threshold signal strength value, in response to comparing the signal strength data received from each of the plurality of transceivers to the threshold signal strength value, performing, with the electronic processor a localization of the portable communication device generating the Bluetooth signal to determine whether the portable communication device is located inside or outside the vehicle, and passively performing the operation based on whether the portable communication device is located inside or outside the vehicle.

In some embodiments, performing the localization of the portable communication device to determine whether the portable communication device is located inside or outside the vehicle includes arranging the signal strength data received from each of the plurality of transceivers in ascending order, comparing a first signal strength value in the ascending order to a first threshold, comparing a second signal strength value in the ascending order to a second threshold, comparing a third signal strength value in the ascending order to a third threshold, and determining that the portable communication device is located inside the vehicle in response to the first signal strength value exceeding the first threshold, the second signal strength value exceeding the second threshold, and the third signal strength value exceeding the third threshold.

In some embodiments, receiving the signal strength data from each of the plurality of transceivers includes receiving the signal strength data from each of a first plurality of transceivers positioned within the vehicle and the method further comprises receiving, via each of a second plurality of transceivers positioned on an exterior surface of the vehicle, signal strength data associated with the portable communication device using a Bluetooth signal received at an antenna associated with each of the second plurality of transceivers, sorting the signal strength data received from each of the second plurality of transceivers to determine a minimum signal strength value, adding an offset to the minimum signal strength value to generate an offset signal strength value, averaging the signal strength data received from each of the first plurality of transceivers to determine an average signal strength value, and comparing the offset signal strength value to the average signal strength value, wherein performing the localization of the portable communication device to determine whether the portable communication device is located inside or outside the vehicle includes performing the localization in response to comparing the signal strength received from each of the first plurality of transceivers to the threshold signal strength value and in response to comparing the comparing the offset signal strength value to the average signal strength value.

Yet another embodiment provides a non-transitory, computer-readable medium storing instructions that, when executed by an electronic processor, perform a set of functions. The set of functions comprises receiving, via each of a plurality of transceivers associated with a vehicle, signal strength data associated with a portable communication device using a Bluetooth signal received at an antenna associated with each of the plurality of transceivers, comparing for each of the plurality of transceivers, the signal strength data with a threshold signal strength value, in response to comparing the signal strength data received from each of the plurality of transceivers to the threshold signal strength value, performing a localization of the portable communication device generating the Bluetooth signal to determine whether the portable communication device is located inside or outside the vehicle, and performing an operation of the vehicle based on whether the portable communication device is located inside or outside the vehicle.

In some embodiments, performing the localization of the portable communication device to determine whether the portable communication device is located inside or outside the vehicle includes arranging the signal strength data received from each of the plurality of transceivers in ascending order, comparing a first signal strength value in the ascending order to a first threshold, comparing a second signal strength value in the ascending order to a second threshold comparing a third signal strength value in the ascending order to a third threshold, and determining that the portable communication device is located inside the vehicle in response to the first signal strength value exceeding the first threshold, the second signal strength value exceeding the second threshold, and the third signal strength value exceeding the third threshold.

In some embodiments, receiving the signal strength data from each of the plurality of transceivers includes receiving the signal strength data from each of a first plurality of transceivers positioned within the vehicle and the set of functions further comprises receiving, via each of a second plurality of transceivers positioned on an exterior surface of the vehicle, signal strength data associated with the portable communication device using a Bluetooth signal received at an antenna associated with each of the second plurality of transceivers, sorting the signal strength data received from each of the second plurality of transceivers to determine a minimum signal strength value, adding an offset to the minimum signal strength value to generate an offset signal strength value, averaging the signal strength data received from each of the first plurality of transceivers to determine an average signal strength value, and comparing the offset signal strength value to the average signal strength value, wherein performing the localization of the portable communication device to determine whether the portable communication device is located inside or outside the vehicle includes performing the localization in response to comparing the signal strength received from each of the first plurality of transceivers to the threshold signal strength value and in response to comparing the comparing the offset signal strength value to the average signal strength value.

Various features and advantages of some embodiments are set forth in the following claims.

In the foregoing specification, specific embodiments have been described. However, one of ordinary skill in the art would appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as critical, required, or essential features or elements of any or all the claims. The invention is defined solely by the appended claims, including any amendments made during the pendency of this application, and all equivalents of those claims as issued.

The Abstract of the Disclosure is provided to allow the reader to quickly ascertain the nature of the technical disclosure, and is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Thus, the following claims are hereby incorporated into the Detailed Description, with each claim standing on its own as a separately claimed subject matter.

We claim:

1. A system for controlling an operation of a vehicle using a portable communication device, the system comprising:
    a vehicle access system coupled to each of a plurality of transceivers associated with the vehicle, the vehicle access system configured to:
        receive, from each of the plurality of transceivers, signal strength data associated with the portable communication device-using a signal received at an antenna associated with corresponding one of the plurality of transceivers,
        sort the signal strength data received via each of the plurality of transceivers to determine a minimum signal strength value,
        add an offset to the minimum signal strength value to generate an offset signal strength value,
        perform a localization of the portable communication device to determine whether the portable communication device is located in an area inside the vehicle or in an area outside the vehicle using the offset signal strength value, and
        determine whether to perform the operation based on whether the portable communication device is located in the area inside the vehicle or in the area outside the vehicle.

2. The system of claim 1, wherein the plurality of transceivers is a first plurality of transceivers and wherein the vehicle access system is configured perform the localization of the portable communication device using the offset signal strength value and signal strength data received via each of a second plurality of transceivers.

3. The system of claim 2, wherein first plurality of transceivers is positioned within the vehicle and wherein the second plurality of transceivers is positioned on an exterior surface of the vehicle.

4. The system of claim 2, wherein the second plurality of transceivers includes four transceivers positioned at four corners within an interior of the vehicle.

5. The system of claim 2, wherein the vehicle access system is configured to perform the localization of the portable communication device using the offset signal strength and the signal strength data received via each of the second plurality of transceivers by averaging the signal strength data received via each of the second plurality of transceivers to determine an average signal strength value and comparing the offset signal strength value to the average signal strength value.

6. The system of claim 2, wherein the vehicle access system is configured to perform the localization of the portable communication device using the offset signal strength and the signal strength data received via each of the second plurality of transceivers by arranging the signal strength data received via each of the second plurality of transceivers in ascending order, determining whether a predetermined percentage of the signal strength data received via each of the second plurality of transceivers satisfy a threshold signal strength value defined for a position of the signal strength data within the arranged ascending order, averaging the signal strength data received via each of the second plurality of transceivers to determine an average signal strength value, and comparing the offset signal strength value to the average signal strength value.

7. The system of claim 6, wherein the threshold signal strength value for each of the second plurality of transceivers is based on a dimension of the vehicle.

8. The system of claim 1, wherein the vehicle access system is further configured to
    receive a challenge request from the portable communication device, and
    send an interrogative signal in response to the challenge request from the portable communication device.

9. The system of claim 8, wherein the vehicle access system is further configured to receive an encrypted code from the portable communication device, and
    wherein the vehicle access system is configured to perform the operation based on whether the portable communication device is located in the area inside the vehicle or in the area outside the vehicle and based on the encrypted code.

10. The system of claim 1, wherein the vehicle access system is configured to calibrate the plurality of transceivers based at least in part on placing the portable communication device at a pre-defined location with respect to the vehicle.

11. The system of claim 1, wherein the operation includes at least one selected from a group consisting of locking the vehicle, unlocking the vehicle, and starting an engine or motor the vehicle.

12. The system of claim 1, wherein at least one of the plurality of transceivers includes a Bluetooth low energy (BLE) module.

13. The system of claim 1, wherein the portable communication device is selected from a group consisting of a handheld device and a wearable device.

14. The system of claim 13, wherein the handheld device includes an item selected from a group consisting of a smart phone and a key fob.

15. The system of claim 13, wherein the wearable device includes an item selected from a group consisting of a smart watch and a health monitoring device.

16. A method of passively performing an operation of a vehicle via a portable communication device, the method comprising:
    receiving, via each of a plurality of transceivers, signal strength data associated with the portable communication device using a signal received at an antenna associated with corresponding one of the plurality of transceivers;

sorting the signal strength data received via each of the plurality of transceivers to determine a minimum signal strength value;

adding an offset to the minimum signal strength value to generate an offset signal strength value;

performing a localization of the portable communication device to determine whether the portable communication device is located in an area inside the vehicle or in an area outside the vehicle using the offset signal strength value; and determining whether to passively perform the operation based on whether the portable communication device is located in the area inside the vehicle or in the area outside the vehicle.

17. The method of claim 16, wherein receiving the signal strength data associated with the portable communication device using the signal received at the antennae associated with corresponding one of the plurality of transceivers includes receiving the signal strength data from a first plurality of transceivers and wherein performing the localization of the portable communication device to determine whether the portable communication device is located in the area inside the vehicle or in the area outside the vehicle including performing the localization of the portable communication device using the offset signal strength value and signal strength data received via each of a second plurality of transceivers, wherein the first plurality of transceivers is positioned within the vehicle and wherein the second plurality of transceivers is positioned on an exterior surface of the vehicle.

18. The method of claim 17, wherein performing the localization of the portable communication device using the offset signal strength and the signal strength data received via each of the second plurality of transceivers includes averaging the signal strength data received via each of the second plurality of transceivers to determine an average signal strength value and comparing the offset signal strength value to the average signal strength value.

19. The method of claim 17, wherein performing the localization of the portable communication device using the offset signal strength and the signal strength data received via each of the second plurality of transceivers includes arranging the signal strength data received via each of the second plurality of transceivers in ascending order, determining whether a predetermined percentage of the signal strength data received via each of the second plurality of transceivers satisfy a threshold signal strength value defined for a position of the signal strength data within the arranged ascending order, averaging the signal strength data received via each of the second plurality of transceivers to determine an average signal strength value, and comparing the offset signal strength value to the average signal strength value.

20. A non-transitory, computer-readable medium storing instructions that, when executed by an electronic processor, perform a set of functions, the set of functions comprising:

receiving, via each of a first plurality of transceivers positioned on an exterior surface of a vehicle, signal strength data associated with a portable communication device using a signal received at an antenna associated with corresponding one of the first plurality of transceivers;

sorting the signal strength data received via each of the first plurality of transceivers to determine a minimum signal strength value;

adding an offset to the minimum signal strength value to generate an offset signal strength value;

performing a localization of the portable communication device to determine whether the portable communication device is located in an area inside the vehicle or in an area outside the vehicle using the offset signal strength value and signal strength data received via each of a second plurality of transceivers positioned within the vehicle; and determining whether to passively perform an operation based on whether the portable communication device is located in the area inside the vehicle or in the area outside the vehicle.

* * * * *